United States Patent [19]

Moore

[11] Patent Number: 4,787,053

[45] Date of Patent: Nov. 22, 1988

[54] COMPREHENSIVE ENGINE MONITOR AND RECORDER

[75] Inventor: M. Samuel Moore, Northridge, Calif.

[73] Assignee: Semco Instruments, Inc., Valencia, Calif.

[21] Appl. No.: 784,724

[22] Filed: Oct. 4, 1985

Related U.S. Application Data

[63] Continuation-in-part of Ser. No. 335,841, Dec. 30, 1981, Pat. No. 4,575,803.

[51] Int. Cl.[4] ............... G11B 5/02; G01M 15/00
[52] U.S. Cl. ................... 364/551.01; 364/550; 364/442; 364/507; 340/945; 340/959; 73/117.4; 360/5
[58] Field of Search .............. 364/442, 550, 551, 507; 340/945, 959, 963; 73/117.4; 360/5

[56] References Cited

U.S. PATENT DOCUMENTS

| | | | |
|---|---|---|---|
| 4,258,421 | 3/1981 | Juhasz et al. | 364/442 |
| 4,312,041 | 1/1982 | DeJonge | 340/969 |
| 4,590,475 | 5/1986 | Brown | 340/969 |
| 4,621,335 | 11/1986 | Bluish et al. | 364/550 |
| 4,729,102 | 3/1988 | Miller, Jr. et al. | 364/442 |

Primary Examiner—Parshotam S. Lall
Assistant Examiner—Ellis B. Ramirez
Attorney, Agent, or Firm—Poms, Smith, Lande & Rose

[57] ABSTRACT

A comprehensive turbine engine monitoring and recording system includes an electronics unit which may be engine mounted, and which contains at least a non-volatile memory and a data-processor, for use with a remote unit suitable for either cockpit mounting or for accessing by a ground portable unit which may include an additional data-processor and display and/or printer units. Raw input data is supplied to the electronics unit, and this input information may include engine and outside air temperature, torque, engine speed, vibration, altitude and airspeed data, for examples. Exceedance data relative to the operation of the aircraft above predefined limits of temperature, torque and speed are recorded, with the details of each exceedance being permanently stored. In addition, over-limits levels are segregated and the total time during which the engine is operated within each of the over-limits bands is measured, and is recorded in a non-volatile, electronically alterable memory which is periodically updated during operation of the aircraft. The number of starts, and power cycles are also counted and stored, and the total running time of the engine is also recorded. Upon command from the remote unit, information is transferred from the non-volatile memory to any of a number of remote data storage, or data processing units, which may include printer and/or display units, so that the time at which the turbine has been operated at specific over-temperature levels, and other important operating data may be readily accessed. Data required for engine trend monitoring is also automatically recorded so that long term plots and interpretation of engine degradation may be accomplished.

29 Claims, 20 Drawing Sheets

START CYCLE BASED ON TEMP

POWER CYCLE BASED ON TEMP AND TORQUE LEVEL

LIFE FATIGUE CYCLE BASED ON TEMP AND Ng SPEED

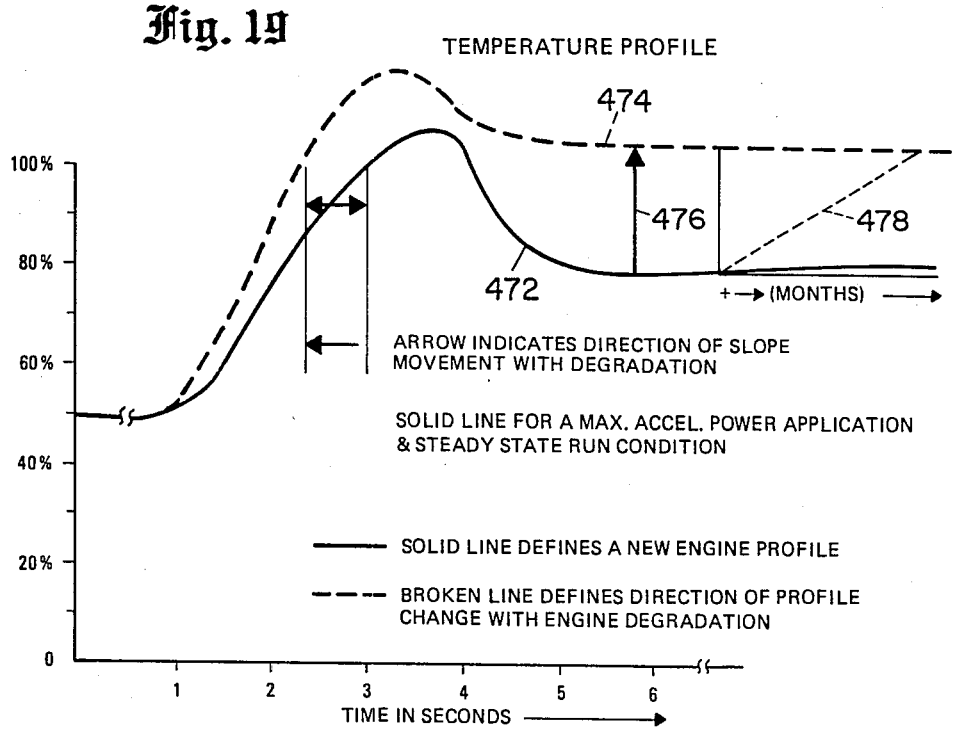
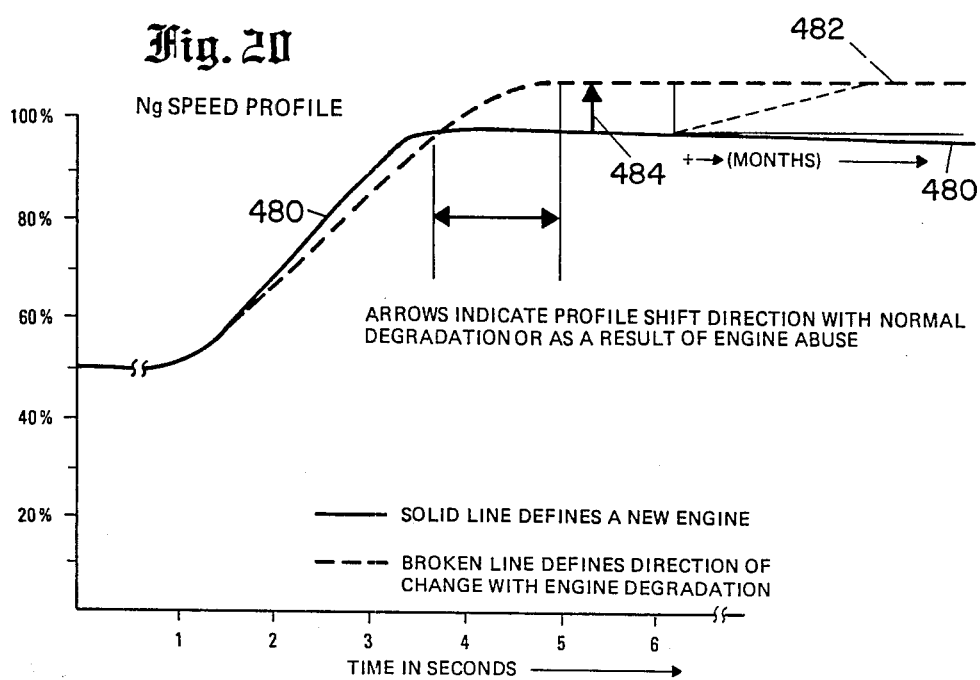

COMPREHENSIVE ENGINE MONITOR AND RECORDER

RELATED PATENT APPLICATIONS

This patent application is a continuation-in-part of my co-pending prior U.S. patent application Ser. No. 335,841, now U.S. Pat. No. 4,575,803, filed Dec. 30, 1981.

FIELD OF THE INVENTION

This invention relates to turbine engine monitoring, recording and data transfer systems, with particular emphasis on engine trend monitoring, and on exceedances, or operation of the engine beyond the manufacturer's temperature, torque or speed specifications.

BACKGROUND OF THE INVENTION

It is well known that aircraft turbine engines must be periodically overhauled; and that turbine engine overhaul is an expensive and time-consuming operation, normally costing well over $50,000 for a major overhaul. Various proposals have been made heretofore to monitor use and abuse of aircraft turbine engines, and typical prior patents which have been directed to one aspect of this situation or another include J. Codomo U.S. Pat. No. 3,946,364, granted Mar. 23, 1976; M. S. Moore and C. F. Paluka U.S. Pat. No. 3,931,619; and M. S. Moore and C. F. Paluka U.S. Pat. No. 4,116,052, for example. Each of these patents is directed to a specific problem but does not provide all of the information which is desirable for measuring and analyzing the causes, current status, and the trend of aircraft turbine engine degradation.

Incidentally, with regard to engine trend monitoring and analysis, this is a well known procedure, and has in the past involved the manual recording of engine data on a periodic basis, perhaps once each flight when the aircraft has reached stable flight conditions. However, because the manual recording of the necessary data takes some finite period of time, readings of all of the instruments are not taken simultaneously, and errors in reading or recording may introduce undesired deviations in the results. This adverse effect is, of course, due in part to the changes in conditions which occur during the time period required for systematically recording all of the data manually.

Accordingly, an important object of the present invention is the provision of a comprehensive engine monitoring and recording system, which will automatically record basic data involving engine use, abuse and exceedances, and also automatically record all of the basic data for engine trend monitoring, so that errors due to manual trend monitoring data recording are estimated. In addition, it is a further object of the invention to tabulate and display the basic data on aircraft turbine engine use and abuse, or summaries thereof, so that the aircraft owner or user may exercise appropriate management control to minimize the need for costly overhaul and repairs.

Concerning another aspect of aircraft operation, the failure of certain aircraft instruments may require the grounding of the aircraft, until the instrument may be repaired or replaced.

Accordingly, a collateral object of the invention is to provide back-up instrumentation, so that in many cases an aircraft need not be grounded merely because one aircraft instrument is not providing a correct output reading.

As noted above, this is a continuation-in-part of the prior pending U.S. patent application Ser. No. 335,841, filed Dec. 30, 1981. The systems as set forth in the present specification and drawings include all of the functions as disclosed in the prior patent application and a number of additional features to make a more comprehensive system. Accordingly, for completeness, the invention background section from Application Ser. No. 335,841 will be included in the following section of this application.

It has previously been proposed to monitor the temperature of a turbine engine, particularly at over-temperature levels, and one such over-temperature monitoring system is disclosed in U.S. Pat. No. 3,931,619. Another system of this general type is disclosed in the co-pending patent application of Geoffrey Hancock, U.S. Pat. application Ser. No. 197,008, filed Oct. 14, 1980, now U.S. Pat. No. 4,315,296, and assigned to the assignee of the present invention. In these prior arrangements, predetermined weighting characteristics were established and alarm signals were energized when the turbine engine exceeded such predetermined overall limits. These control systems characteristically involve a summation function in which the time at some very high temperature would be equated to a longer time at a slightly lower temperature, and the sum of the weighted factors would be employed to provide an output indication which would give a rough indication of the over-temperature stress or damage to the turbine engine which may have occurred.

However, it would be desirable to have a more accurate indication of the precise amount of time that the turbine engine has been operated, and that it has been operated at particular temperature levels. In addition, supplemental information such as the number of times that the engine has started is also relevant in determining whether periodic maintenance of the eninge is appropriate. Further, in the analysis of the maintenance status of a turbine engine or the reason for certain anomalies in engine performance, it is frequently desirable to be able to determine the details of the recent past history of the operation of the engine in greater detail than has been possible heretofore.

Accordingly, the present invention is intended to overcome the shortcomings of the prior art systems and to provide the more complete historical information of the type outlined hereinabove.

SUMMARY OF THE INVENTION

In accordance with a specific illustrative embodiment of the invention, a turbine engine monitor and recorder includes a non-volatile storage for storing data relating to one or more of the critical engine operating parameters, such as:
1. Temperature
2. Torque
3. Engine Speed
4. Vibration
5. Fuel Flow In addition, other information may be concurrently stored for analysis purposes, and this additional information may include (1) time and date, (2) outside air temperature (O.A.T.) (3) altitude and (4) air speed. Also of interest in analyzing engine performance, overhaul scheduling, and engine use and abuse, (1) the number of engine starts and (2) the number of power cycles, both of which are determined from temperature, torque, engine speed of other operating data, are counted and recorded.

Turbine engine manufacturers usually specify normal temperature and torque operating ranges, and limited time periods for "exceedances" at specified temperature and torque ranges or bands, above the normal operating ranges. In accordance with one aspect of the present invention, the total time of exceedances in each temperature, torque, engine speed, and/or vibration, band or level may be calculated and permanently stored. Also, with regard to individual exceedances, data on each exceedance, as to the duration, and the time in each over-limit band may be stored in non-volatile storage.

A cockpit mounted display may be provided, with arrangements for selecting any of the desired stored information, such as the number of starts, the number of power cycles, the time that the engine has been operated over a predetermined over-limit figure, or within a predetermined over-limit band. The cockpit mounted display may include switches for selecting desired information by setting a channel selection number, and indicator lights for identifying the type of information being displayed and the engine to which the information relates.

In addition to the option of accessing the stored information (1) at the cockpit display, the stored information may be coupled to other data processing systems as follows:

(2) Direct hook-up to P.C. computer, with graphic and/or regular alphanumeric printer.

(3) Handheld ground interrogator (battery powered)

(4) Portable data collection system (5) Microcomputer, such as the TRS-80, portable, battery operated, with graphics printer.

(6) Via modem to main frame computer, such as IBM PC, System 36,38 or 360, and associated graphics or alphanumberic printer.

(7) Via a radio link to a main frame computer, as noted above.

At the option and under the control of the user, the entire permanently stored memory may be "read" into the memory storage associated with the external equipment; or, alternatively, selected information desired for display, graphics or conventional alpha-numeric display may be accessed from the permanent memory.

The graphics display may include the total time in selected overlimits bands, or in relatively severe operating condition bands, to thereby provide a visual summary of the engine exceedances, and thus the total duration of selected exceedance, and/or the details of all of them may be printed for a more comlete analysis of the engine history. Trend monitoring data may also be displayed graphically, to determine engine degradation over longer periods of time, between required overhauls, for example. Regarding trend monitoring, the automatic recording of all relevant data has the advantages, as compared with present manual methods, of: (1) assuring that a consistent set of data taken all at one time is obtained, (2) minimizing variances caused by errors in instrumentation and observation, (3) avoiding manual recording and transcription errors. All of these factors will mean that the resultant trend data will more accurately reflect the true performance variation from flight to flight.

In accordance with one aspect of the invention, the basic electronics unit may be mounted on the turbine engine, and may include a data processor, and permanent, non-volatile memory storage arrangements, which may be electronically erased and updated. The inputs to this electronics unit has been noted above. The temperature, torque, engine speed and vibration data, or selected ones of these parameters, are compared to certain preset over-limits ranges or channels, which may conform to an address or storage location in the nonvolatile memory where over-limits information relative to the particular over-limits channel is stored.

During turbine engine operation, the previously stored digital information relating to the total time the turbine engine has been operated in different overlimit bands or ranges, may be withdrawn from storage and may be updated with supplemental information, and the revised total time information for the particular over-limits channel may then be returned to the non-volatile storage unit.

Located remote from the engine unit, in a cockpit mounted unit, or elsewhere as discussed above, may be a digital interrogator, or an additional microprocessor or computer, and a digital display, along with switches or a keyboard for calling up the desired information and having it displayed, or printed out. The digital information may be transmitted serially from the non-volatile memory in the engine-mounted unit to the remote display unit. With this arrangement, only a few wires need be connected from each of the engine mounted units to the remote electronics.

Concerning another aspect of the invention, the matter of "Power Assurance" may be critical and is dependent on the past history and the condition of the turbine engines, which are monitored in accordance with the present invention. Thus, if a two engine helicopter is to be used to transport personnel to an off-shore drilling platform, it is important to know that, in the event one of the engines should fail, the other engine could supply the additional amount of power for a long enough duration to reach a safe landing location. Through trend-monitoring and an analysis of the levels at which the engines have been operated since the last engine overhaul, an estimate may be made of the capability of each engine at any point in time, and may be provided upon request. In addition, upon starting a turbine powered aircraft, prior to take-off or as part of the take-off procedure, a special short power assurance cycle may be undertaken, and the computation of pertinent engine data can quickly assess the engine performance efficiency that relates to power assurance determination.

In accordance with another aspect of the invention, the use of the cockpit display as shown in FIG. 11, with its switch arrangements for calling up desired information, serves as a back-up for other aircraft engine instrumentation. Thus, if a particular cockpit display instrument is non-functional, the aircraft may be grounded until repairs are made. However, where the missing information may be selectively called up on the display of FIG. 11, the aircraft may make its scheduled flight, and the instrument repaired at the regular maintenance schedule or more convenient time. Typical information which may be called up include the information permanently stored, as discussed elsewhere herein, and normal operating parameters such as (1) engine temperature, (2) engine torque, (3) fuel flow rate, (4) flight fuel consumption, (5) compressor turbine speed, (6) power turbine speed, (7) indicated air speed, (8) outside air temperature and (9) pressure altitude.

Another important aspects of the invention involves the automatic recording of all of the data needed for turbine engine trend monitoring, instead of the manual recording of such data which has been common practice heretofore. This automatically recording trend monitoring data is permanently stored; and may on command be "transferred" and externally processed. Alternatively, the system may include capabilities for internally processing and graphically displaying the engine trend data.

Other objects, features and advantages of the invention will become apparent from a consideration of the following detailed description and from the accompanying drawing.

BRIEF DESCRIPTION OF THE DRAWINGS

FIGS. 19, 20 and 21 indicate changes in engine operating conditions with time of engine operation, or abuse, useful for trend monitoring purposes;

DETAILED DESCRIPTION

Figure 1:
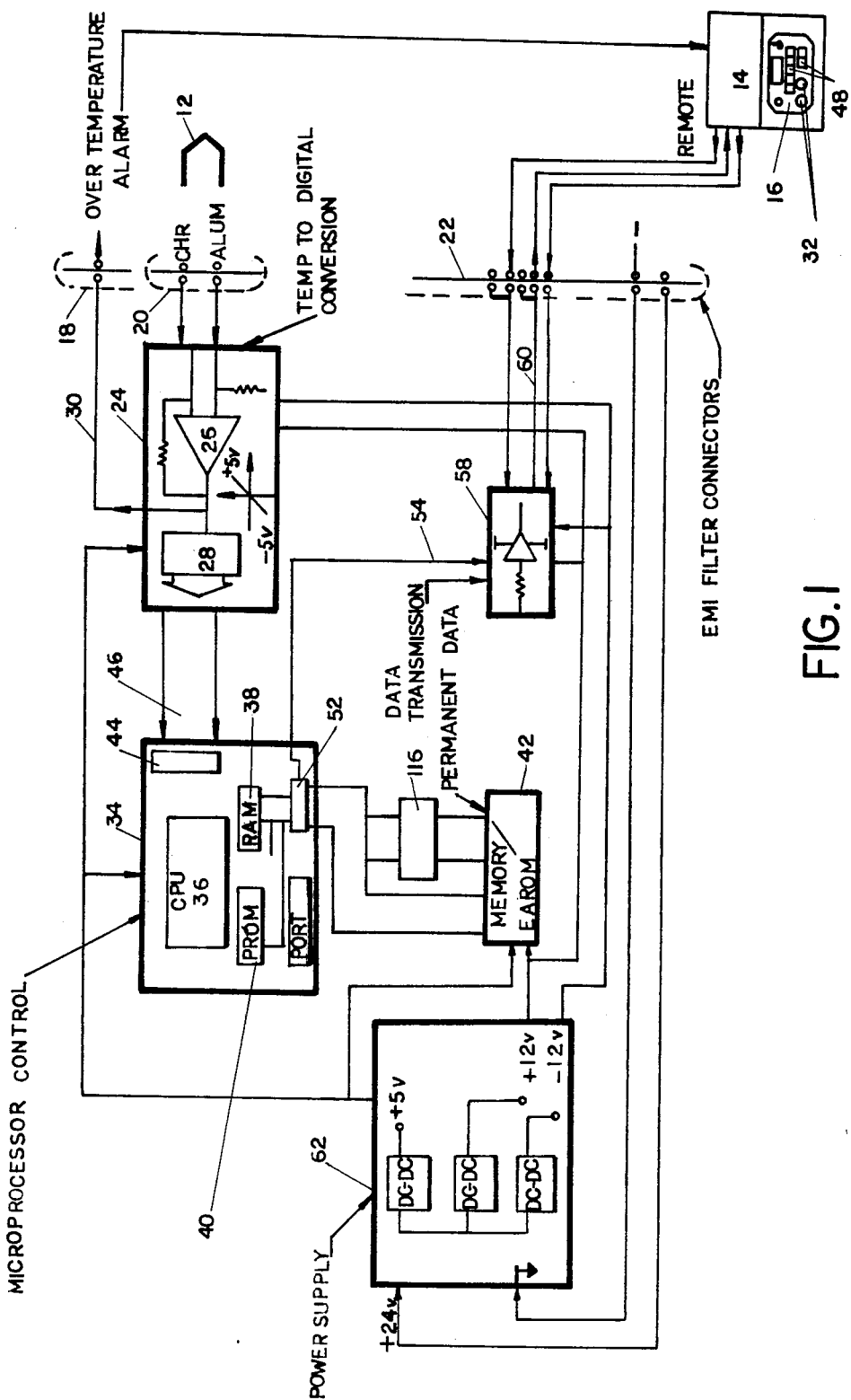
FIG. 1 is a block circuit diagram showing one illustrative embodiment of the present invention.

Referring more particularly to the drawings, FIG. 1 essentially shows the engine mounted electronic unit, with only the thermocouple 12 and the remote electronic unit 14 with ts associated display 16 being schematically shown to the right in FIG. 1 outside of the electronic connections 18, 20 and 22.

The input from thermocouple 12 is processed in unit 24 which includes an operational amplifier 26 which receives and amplifies the signal from thermocouple 12, and the analog to digital converter 28 which provides 10 binary digits or bits as an output signal indicating the temperature level. An over-temperature alarm signal is routed on lead 30 through connector 18 to the remote unit 14 where over-temperature alarm lights 32 signal excessive temperature for the left or the right engine.

The electronic unit 34 includes a data-processor having a central processing unit 36, a random access memory 38 and a program read-only memory 40. A non-volatile memory 42 is employed to store cumulative, long-term temperature information of the history of the turbine engine with which the electronic unit is associated, as more fully described below.

Now, in Table I set forth below, a typical table of temperature channel specifications is set forth. This temperature specification table includes the channels of information which may be obtained and displayed in the display unit 16. More specifically, the temperature channel specifications as set forth in Table I indicate a discrete set of temperature bands. Thus, for example, temperature channel 3 relates to the temperature range between 819.5° C. and 830.8° C. Included in the PROM 40 is a table indicating these temperature bands and limits as set forth in Table I. The information from the analog-to-digital converter 28 as supplied to the input/output circuit 44 over bus 46 is periodically sampled and commpared with the temperature bands as set forth in Table I and as included in the PROM 40. Within the non-volatile memory 42 are a set of memory storage locations corresponding respectively to each of the many channels included in Table I. Following the comparison step mentioned above, the channel or channels which are involved are identified, and the information is withdrawn from memory 42 and held in local storage, and is incremented by a time interval corresponding to the processing and sampling rate of the microprocessor 34. The modified or incremented information is then returned to the storage unit 42, so that the total time in each over-limit temperature band or range is continuously available.

TABLE I

| Temperature Channel | Function | Temperature Band Limits ±5° C.* | | Resolution Time Recording* | Display Format |
|---|---|---|---|---|---|
| | | (Lower) | (Upper) | | |
| 1 | Number of Starts | 300° C.- — | | — | 99999 cycles |
| 2 | Running Time | 300° C.- — | | 0.1 hours | 9999.9 hours |
| 3 | Total Time over | 819.5° C.-830.8° C. | | .01 hours | 999.99 hours |

TABLE I-continued
TEMPERATURE CHANNEL SPECIFICATIONS

| Temperature Channel | Function | Temperature Band Limits ±5° C.* | | Resolution Time Recording* | Display Format |
| --- | --- | --- | --- | --- | --- |
| | | (Lower) | (Upper) | | |
| 3A | Time Exceeding Band Limits 819.5° C. | 819.5° C.–830.8° C. | | .01 hours | 999.99 hours |
| 4 | Time Exceeding 830.8° C. | 830.8° C.–838.0° C. | | .001 hours | 99.999 hours |
| 4A | Time Exceeding Band Limits | 830.8° C.–838.0° C. | | .001 hours | 999.99 minutes |
| 5 | Total Time over 838.0° C. | 838.0° C.–849.3° C. | | .01 minutes | 999.99 minutes |
| 5A | Time Exceeding Band Limits | 838.0° C.–849.3 C. | | .01 minutes | 999.99 minutes |
| 6 | Time Over 849.3° C. | 849.3° C.– — | | .01 seconds | 999.99 seconds |

*Limits subject to engine manufacturer requirements.

The foregoing steps are set forth in slightly different format in Table II:

TABLE II

1. Periodic Sampling of Temperature or Other Parameter Input
2. Digital to Analog Conversion
3. Comparator Step.
4. Identification of Memory Locations for Time Information for Each Specific Temperature or Other Parameter Range
5. Withdrawal of Stored Information From All Associated Temperature or Other Parameter Channels.
6. Incrementing of Data from these relevant Memory Locations.
7. Return of Modified Channel Information to Memory Storage Locations in Non-Volatile Memory.
8. For (A) Channels, an Allowable Time Period is Substracted From the Increment by Which the Stored Time is Increased.

When information is ordered up by the actuation of one of the switches 48 associated with the remote electronics and display unit 14, the information is transmitted from the non-volatile memory on the data bus 50 to the 8 bit storage and shift register unit 52. The information is then transmitted serially on lead 54 to the output driver 58 and is transmitted on lead 60 to the remote electronics and display unit 14,16.

The power supply 62 is conventional and merely converts from the 24 volt aircraft power supply to the plus and minus 12 volts required for operation of the electronic circuitry and to the +5 volt power required for certain of the additional circuits.

Figure 2:
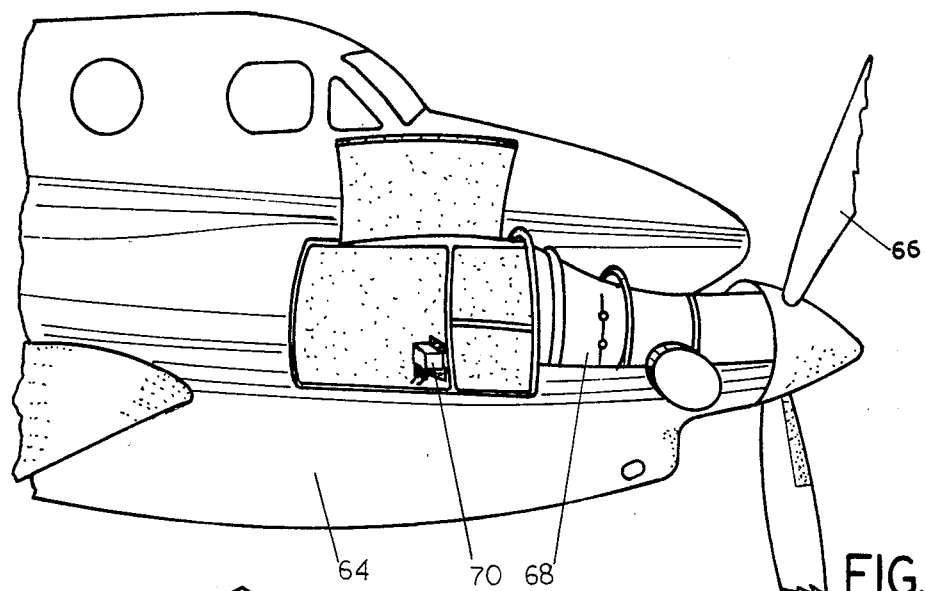
FIG. 2 is a schematic showing of a two-engine aircraft in which the propellers are powered by turbine engines.

FIG. 2 is showing of a prop jet aircraft in which the aircraft 64 is driven by the propeller 66 powered from the turbine engine 68. The aircraft 64 is shown as a twin-engine plane, with the other engine being located beyond the main fuselage. In FIG. 2 the one engine-mounted electronics unit 70 is shown, and there is of course another one mounted in the left engine. The circuitry as shown in FIG. 1 is that which is included within the unit 70, while the thermocouple 12 (which may represent a series of thermocouples) is mounted adjacent to the engine 68, normally near the exhaust or at an inter-stage location of this engine. The single remote unit 14 with the associated display 16 and switches 48, may be mounted within the cockpit compartment, or may be a portable test unit provided for maintenance and repair. In either case, both of the two engine mounted units are connected to a single remote unit 14, 16.

Figure 3:
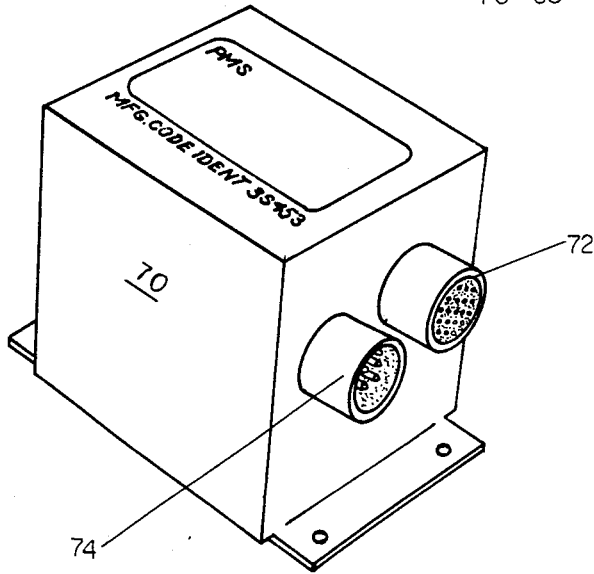
FIG. 3 is an exterior view of an engine mounted electronic unit.

FIG. 3 shows the exterior configuration of an engine mounted unit 70 including the terminal plugs 72 and 74.

Figure 4:
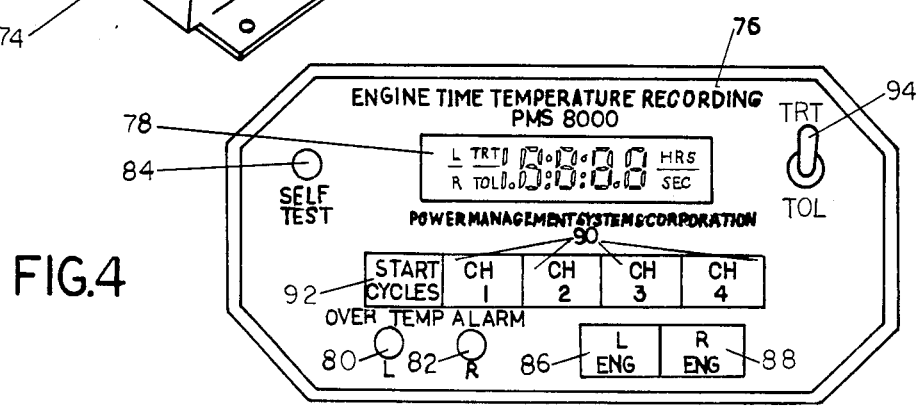
FIG. 4 shows a display and switching panel which may be mounted either on the instrument panel in the airplane cockpit, or in a remote portable test unit.

FIG. 4 shows the display which may be part of the instrument display in the cockpit or may be included on the portable test unit which may be used for ground servicing. The display panel 76 includes the digital display 78, the over-temperature alarm signals 80 and 82 for the left and the right engines, respectively, the self-test switch and signal 84, the push-button switches 86 and 88 for the left and the right engines, respectively, and the channel selection switches 90. At the left hand end of the row of channel selection switches 90 is the additional switch 92 designated "start cycles", and depressing this pushbutton switch causes a number to appear on the display unit 78 representing the number of times that the temperature of the engine has risen to a temperature above 300° C., a very low temperature for a turbine engine, and then returned to a temperature below this level. The switch 94 may be used with each channel and indicates either the total time over limits ("TOL", which refers to the length of time beyond the manufacturers rated time of operation in the particular temperature band); and the switch position designated "TRT" which indicates the total running time over the minimum temperature of the band under consideration.

Figure 5A:
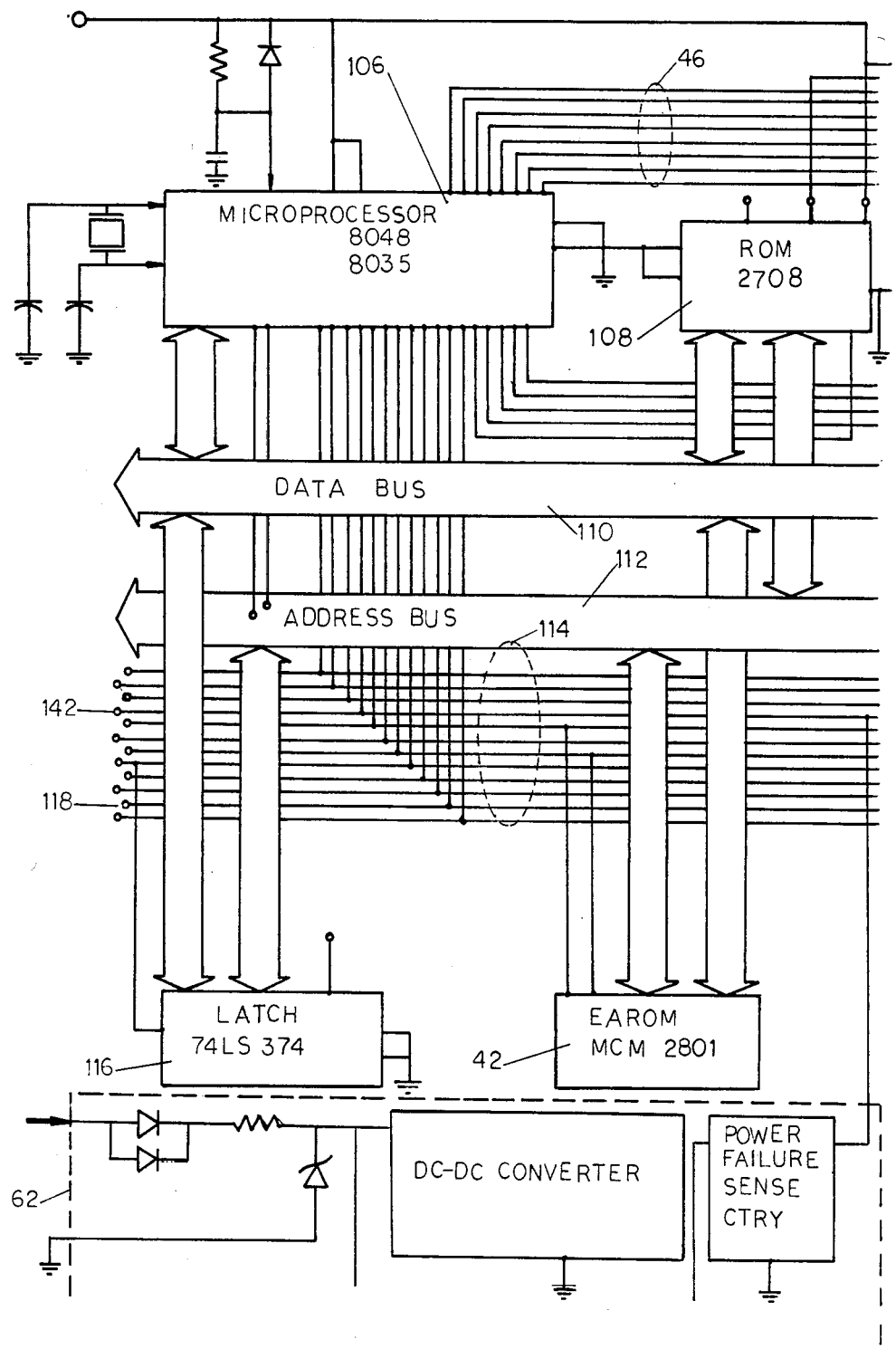
FIGS. 5A and 5B are circuit diagrams indicating the actual circuitry included within the engine mounted electronics units.
Figure 5B:
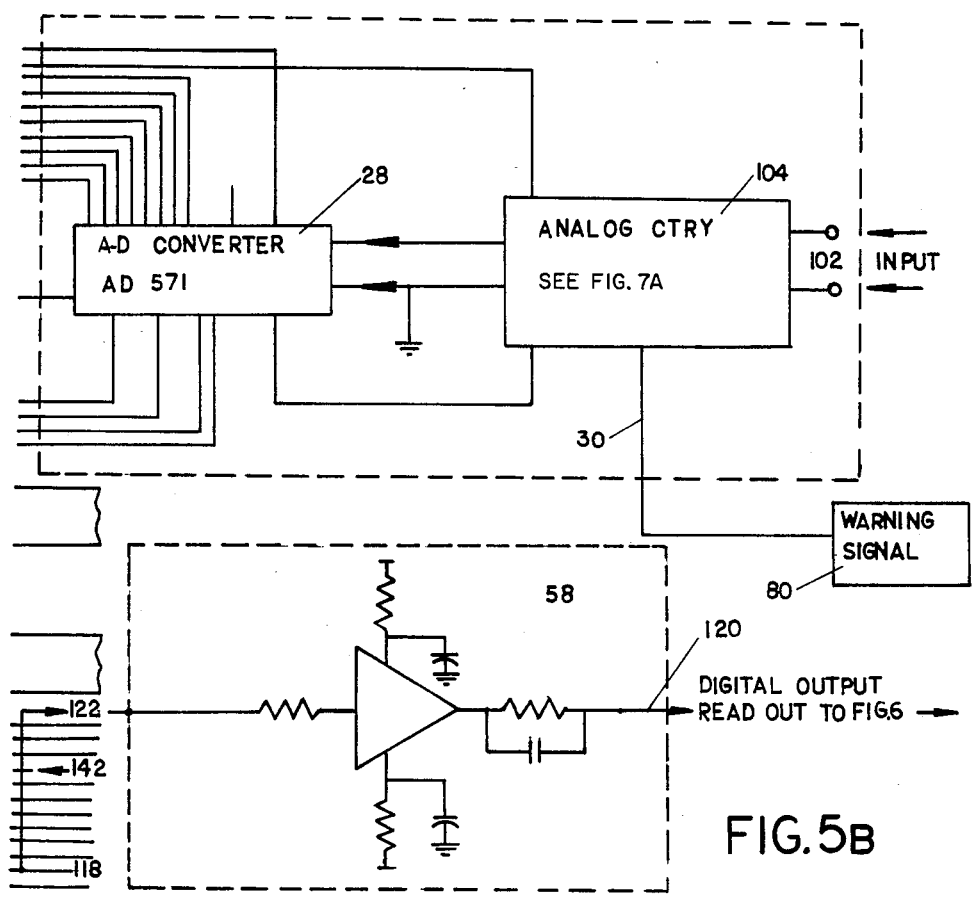

Now, turning to FIGS. 5A and 5B, this is a somewhat more detailed showing of the circuit of FIG. 1. More specifically, the output from the thermocouple is applied to the terminals 102 at the input to the analog circuit 104. Incidentally, this analog circuit 104 will be shown in greater detail in connection with FIG. 7, and serves to compensate and amplify the temperature signal provided by the thermocouple. The output from the analog circuitry 104 is applied to the analog-to-digital converter 28. The output lead 46 from the analog-to-digital converter supply a ten bit conversion of the temperature level to the microprocessor chip 106, which for example may be an Intel chip such as the 8035 or the 8048. The ROM 108 includes sequential instructions for the operation of the microprocessor 106 and for the periodic sampling of temperature data, and also includes the engine operating parameters and the limits for temperature band definition. Incidentally, in addition to just temperature data, other inputs may could be provided to the engine mounted electronic unit, such as torque and engine speed functions; and these may be converted from analog input signals to digital signals, multiplexed with the input temperature signals, supplied to the micro-processor, and eventually ordered up for display by depressing pushbuttons such as the switches 48 as shown in FIG. 1 and the switches 90 and 92 in FIG. 4, to provide additional engine monitoring functions.

Three buses which are included in FIG. 5 include the data bus 110, the address bus 112, and the control bus 114; and data carried on the data bus 110 may be supplied to or from the microprocessor 106, and to or from the EAROM 42 which is a non-volatile memory unit, in accordance with instructions provided on the address bus 112. The letters "EAROM" stand for "Electrically Alternable Programmable Read-Only Memory". The latch 116 separates the data and address information which appears sequentially on the data bus to provide the full address information for the memory 42. It may be noted that the serial transmission line or port 118 included in the control bus 114 is employed to direct serial output signals to the output driver 58 which amplifies the data which has been ordered up by depressing selected keys or switches on the display unit, and transmits this data on a serial basis over output lead 120. The lead 122 connects the data lead 118 to the output driver 58. It is to be noted that parallel data transmission is also feasable, but serial transmission is more economical from a cabling point-of-view.

It is also noted that the lead 30 connected from the analog circuitry 104 extends in due course to the remote warning lamp 80', which also appears as light 80 in FIG. 4. This signal is actuated when the temperature exceeds the maximum temperatures as shown in FIG. 7, to be discussed in greater detail below.

Figure 6:
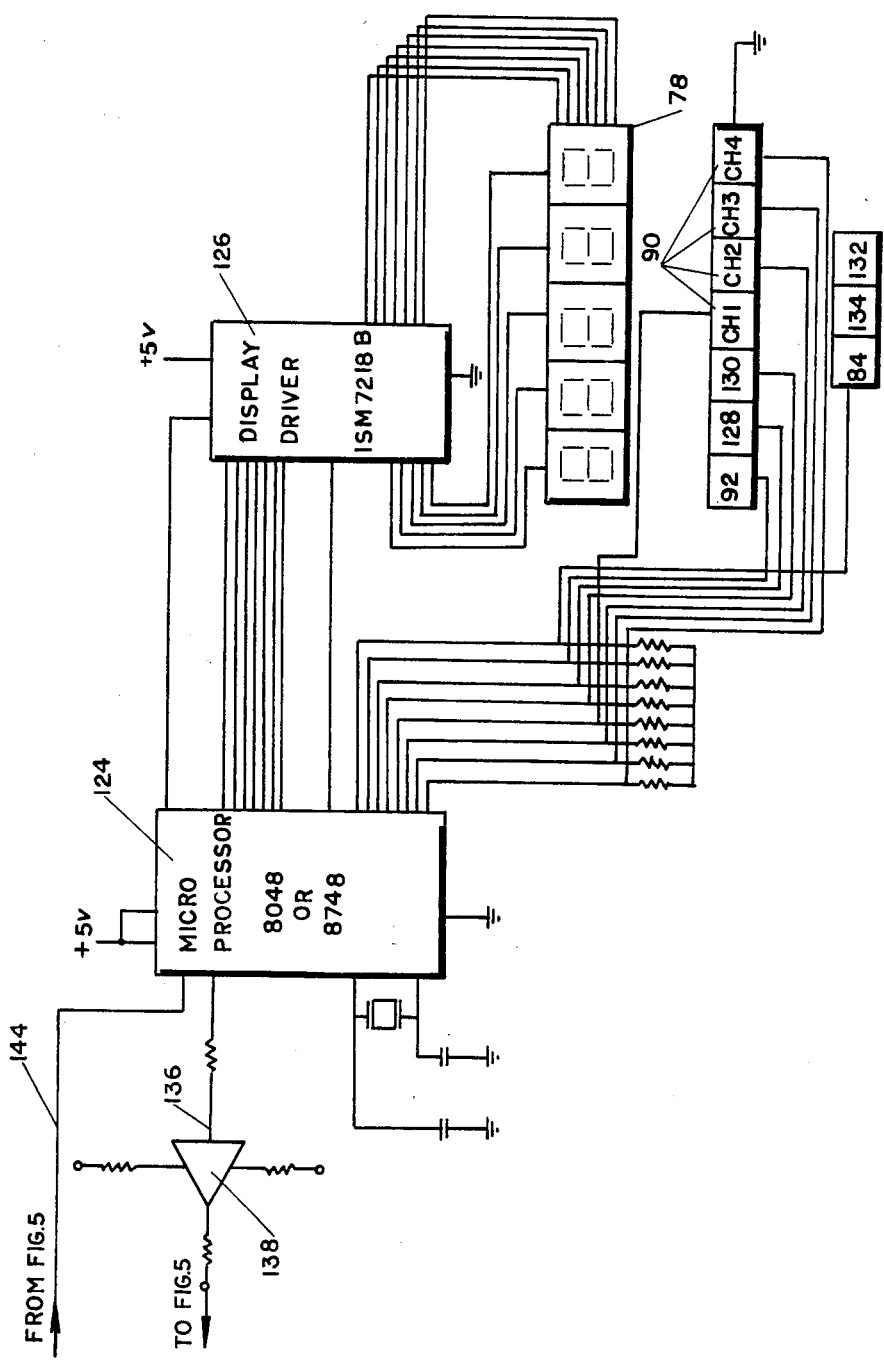
FIG. 6 shows typical electronics which may be included in the remote unit.

FIG. 6 shows the remote circuitry which may be either cockpit mounted, or be included in a ground portable model which may be selectively plugged in to the engine mounted units on the left and the right engines. FIG. 6 includes the microprocessor 124 and the display driver 126 in addition to a five-digit display 78 and the switches 90, 92, 128 and 130. Additional switches include the self-test switch 84 and the power on and off switches 132 and 134.

When one of the temperature channel switches 90, together with one of the switches 128 or 130 is selected, the appropriate interrogation signal is supplied from microprocessor 124 (which includes memory) over lead 136 through amplifier 138 to the interrogation lead 140 which is connected to the interrogation input lead 142 included in the control bus 114. The appropriate information is then ordered up from the non-volatile memory 42 and is transmitted in serial form over lead 118, 122, and 120 to input lead 144 to the microprocessor chip 124 in the remote unit. The display driver 126 is then energized in accordance with conventional and known digital data-processing techniques to display the transmitted data on the display 78.

Figure 7A:
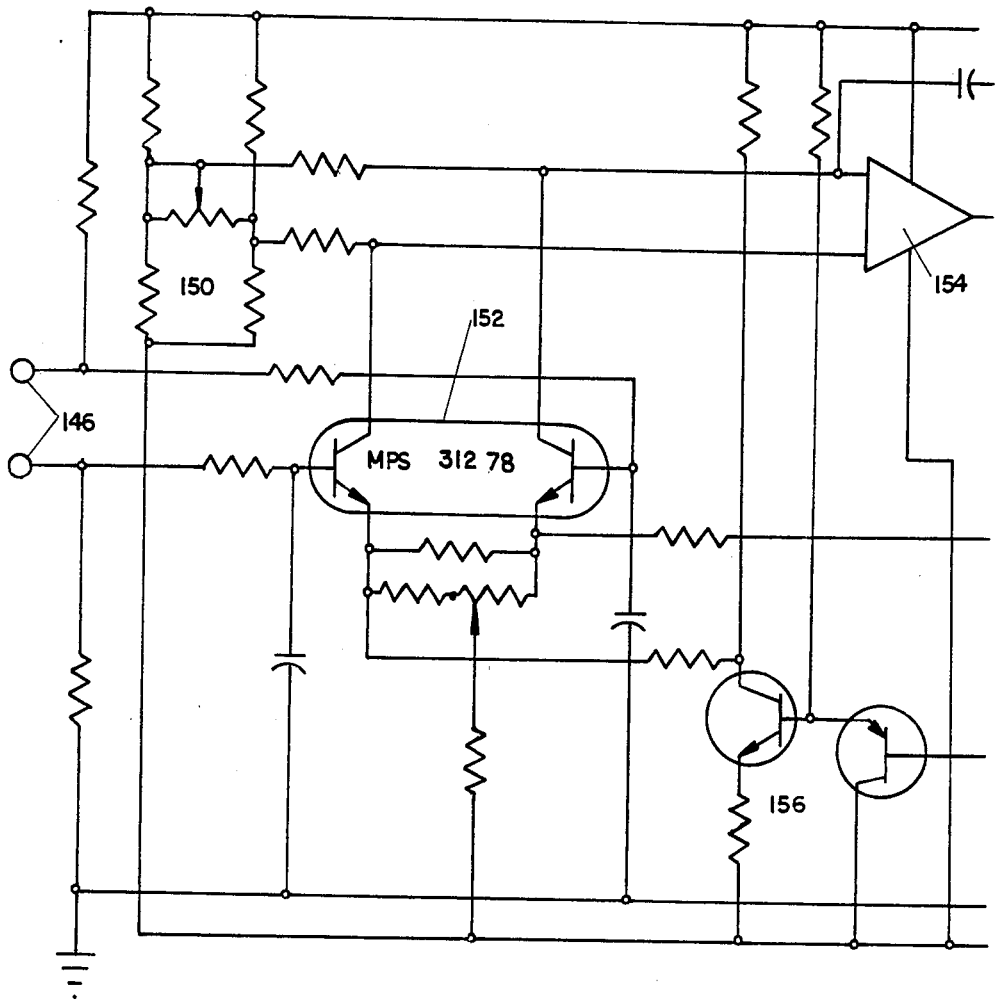
FIGS. 7A and 7B are a detailed circuit diagram showing the amplification and analog-to-digital conversion circuitry which modifies the input temperature signal from the thermocouple.
Figure 7B:
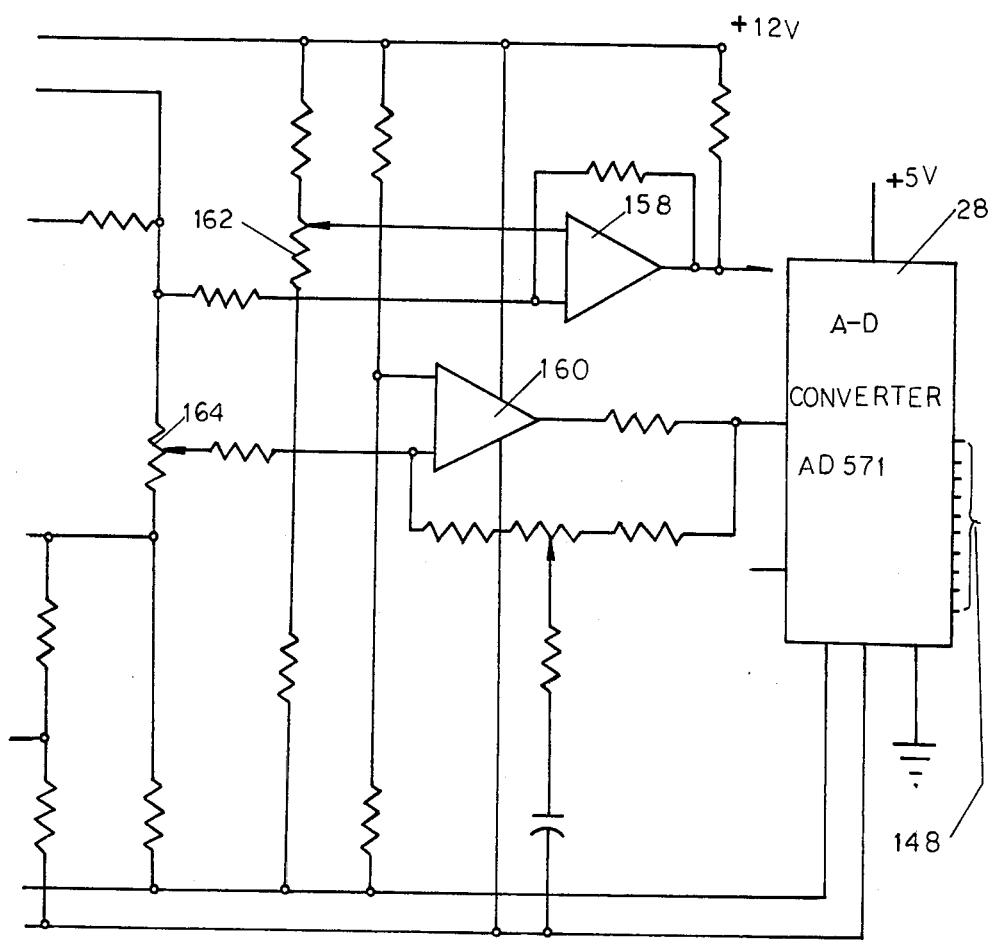

Turning now to FIGS. 7A and 7B, this input circuit has a thermocouple input to the terminals 146, and a digital temperature output at the far right-hand side of FIG. 7 at the leads 148 from the analog to the digital coverter unit 28. The circuitry includes the thermocouple cold-junction temperature compensation bridge 150 and the differential amplifier 152. The output signal from the differential amplifier 152 is amplified by operational amplifier 154 which provides at its output a substantially linear voltage representing the temperature of the turbine engine. Incidentally, a constant current source 156 is included in the circuitry to control emitter current flow in differential amplifier 152. The operational amplifier 158 drives the over-temperature alarm light 80 or 82 as shown in FIG. 4. The operational amplifier 160 couples the output from operational amplifier 154 to the analog-to-digital converter 28. Incidentally, the levels for the temperature alarm signal and for the input to the analog-to-digital converter are established by the potentiometers 162 and 164, respectively. These may of course be adjusted and calibrated to give the desired signal at the proper temperature levels, and to accommodate slight variations in thermocouple output or in the amplification provided by the input circuitry, for example. The output leads 148 at the right-hand side of FIG. 7 are coupled to the 10 bit data bus 46 as shown in FIG. 1.

Figure 8:
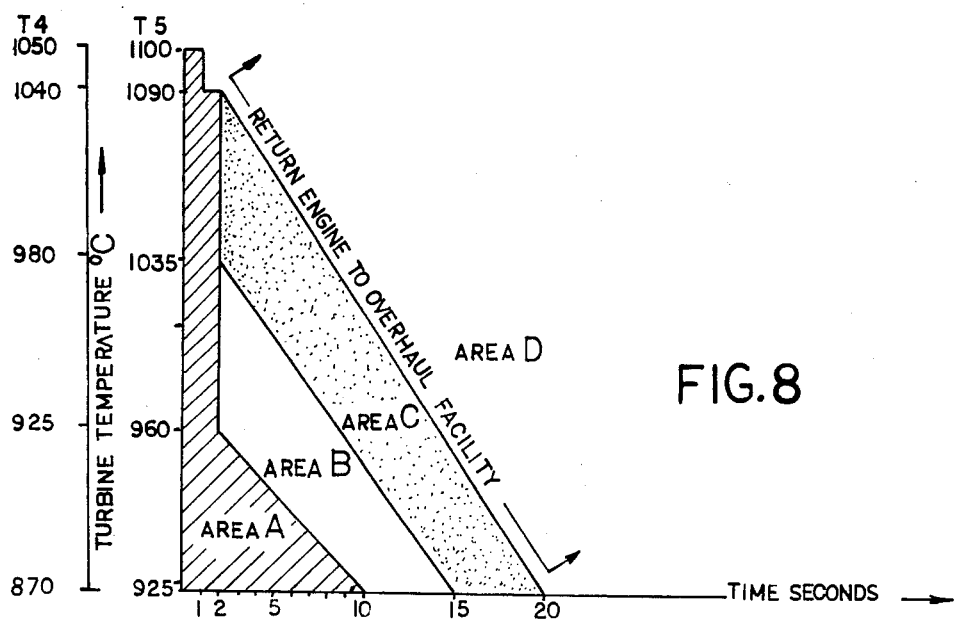
FIG. 8 is a plot indicating the over-temperature ranges for a typical turbine engine, with the allowable time at each temperature level being plotted against turbine temperature.

With reference to FIG. 8, this drawing indicates a typical manufacturer's diagram of over-temperature conditions which may be damaging to the turbine engine in the event that they last longer than certain predetermined limits. First, it may be noted that the horizontal axis of the plot indicates the time in seconds, and the vertical axis of the plot is the temperature in degrees centigrade. The temperature scale has two different plots, one designated T-4 and the other designated T-5. The reason for the different scales involves the different temperatures at successive points along the turbine engine, from T-1 at the engine inlet to T-6 or T-7 at the exhaust. The thermocouple may be located at any of several points at or following the combustion zone, to indicate the engine operating temperature, but the temperatures sensed at these various points will vary significantly, from the turbine inlet point to the turbine inter stage temperature point, to the exhaust zone, and the circuitry must be adjusted to correspond to the actual physical locations of the thermocouple along the turbine engine.

Now, referring to FIG. 8 in more detail, the area indicated by the designation "Area A" in FIG. 8 is a permitted area. This means, for example, that at a T-5 temperature of 930° C., just over the 925° C. initial point in the characteristics, the engine may be operated for 10 seconds and not be damaged or require maintenance. However, beyond this time interval, when it goes into "Area B", certain inspection steps should be taken. Similarly, for Areas C and D, successive more complete inspections and overhaul may be required. More specifically, for Area B it is recommended that the cause of the over-temperature be determined and corrected and that the engine be visually inspected through the exhaust ports of the power turbine blades and through the exhaust duct, turning vanes where appropriate; and a record should be made in the engine log book. For Area C, a hot section inspection should be performed; the compressor blades should be stretch checked without removing the blades from the disk; and a fluorescent penetrant inspection should be made of the compressor turbine and power turbine disks and blades without removing the blades from the disks. For Area D, the engine should be returned to an overhaul facility, the compressor turbine blades and power turbine blades must be discarded, and both of the turbine discs must be subjected to a stretch check and fluorescent penetrant inspection.

Concerning the "time over limits" channels such as 3A and 4A, on each occasion when the engine temperature goes up to an elevated level and remains there for more than the indicated time interval, this time period beyond the allowable time period is recorded and added to that previously stored in the non-volatile memory. Thus, for example, if an engine were permitted by the manufacturer's specifications to remain at a temperature corresponding to channel 5A for 10 seconds, and it actually remained at a temperature above the minimal level for channel 5A for 15 seconds, then 5 seconds would be added to the value stored in the non-volatile memory for channel 5A.

It may also be noted that during the first time that the engine is operated overlimits, that the information stored in the permanent memory will represent a complete history of the exceedance, including the times that the engine was operated in each of the overlimit bands.

Figure 9:
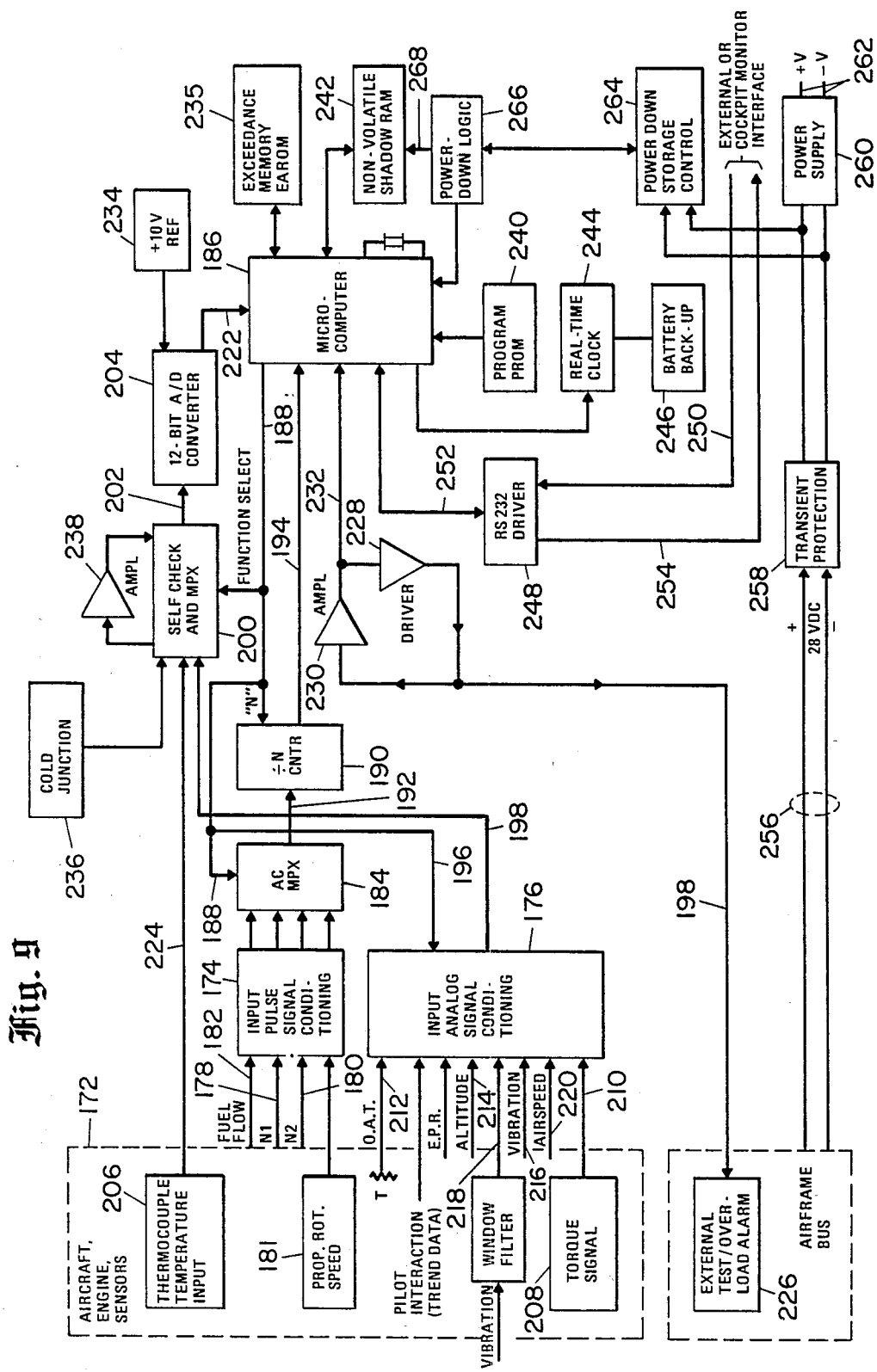
FIG. 9 is a block diagram of a comprehensive monitoring system illustrating the invention.

In FIG. 9 a block diagram of a comprehensive, or over-all engine monitoring and recording system is disclosed. Considering the details of FIG. 9, the aircraft engine and associated sensors are indicated to the left in FIG. 9 at reference numeral 172. There are two principal types of input signals from the aircraft engine to the digital circuitry constituting the bulk of FIG. 9. These are pulse input signals received at circuit 174 in which the input pulse signals are conditioned for use by the digital circuitry, and the inputs to circuit 176 wherein input analog signals are processed, and conditioned for further processing.

Considering first the pulse input signals, they include the speed output quasi-sine wave signals on leads 178, 180, and 181 (when a prop-jet is involved), and the fuel flow input pulses from lead 182 as picked up by a rotary flow sensor. These output signals are limited and supplied to the multiplexer 182. The microcomputer 186 periodically samples these signals supplied to multiplexer 184 by selection signals applied on lead 188. The division ratio of the counter 190 is selected, via the function control lines 188 from microcomputer 186 to the ratio appropriate to the transducer input being selected. A square wave signal, having a frequency reduced appropriately from the quasi-sine wave input by counter circuit 190, is supplied from counter circuit 190 to microcomputer 186 on lead 194. The microcomputer times the interval between successive positive transitions of this square wave signal, and this is a function of the quantity being measured. The microcomputer 186, by applying successive different "select" signals on lead 188 to the multiplexer 184, successively selects the various pulse inputs to the multiplex circuit 184, applies them to the counter circuit 190 and stores the speed or rate of rotation information in the memory circuitry associated with microcomputer 186.

In a similar manner, the microcomputer circuit 186 provides select signals over lead 196 to the analog input signal conditioning circuit 176. These are routed via leads 198 through circuit 200 over lead 202 to the analog-to-digital converter 204. Thus, under normal operating conditions, the select signals applied on lead 196 multiplex different analog outputs signals onto lead 198.

Incidentally, the various analog signals include the thermocouple temperature input 206 which is treated specially, and coupled directly to the self-check and multiplex circuit 200; the torque sensor 208, which forms one of the inputs to the conditioning circuit 176 via lead 210 and the other analog inputs including the outside air temperature on lead 212, the altitude input on lead 214, the unfiltered vibration input on line 216, the filtered vibration output on line 218 and the air speed on line 220. Following the conversion to digital signal format in the analog-to-digital converter 204, these input signals are supplied to the microcomputer 186 on lead 222. Incidentally, may of the circuits shown as individual leads in FIG. 9 many actually be sets of parallel conductors forming a cable or bus for conducting digital signals in parallel in the form of a word or a byte of digital information.

The function of the circuit 200, designated "SELF-CHECK AND MPX" will now be briefly considered. When the data processing system is put into the self-check mode, by appropriate action of the switches to be discussed below in connection with FIG. 10 and FIG. 11 of the drawings, an internally generated voltage representing a thermocouple output voltage at a predetermined temperature is applied from the circuit 200 to the analog-to-digital converter 204, and the flow through of other information on lead 198 and 224 is blocked. The temperature read-out from the unit should then correspond to the selected thermocouple voltage level at which the self-test reference is set.

The function of the circuits 226, 228 and 230 will now be briefly considered. Circuit 226 represents an alarm circuit and associated electrical circuitry for turning the light on to make sure that it is not burned out. When the local switch within circuit 226 is actuated to check the lamp to be sure that it is not burned out, a signal is supplied to amplifier 230 and the information that the testing is occurring is routed back to microcomputer 186 over lead 232. However, when the system is in an overlimit condition, a signal is applied by microcomputer 186 over lead 232 to the driver circuit 228 which energizes circuit 226 to operate the overlimit alarm light.

Also associated with the microcomputer 186 is the exceedance memory 235. When the temperature, torque, speed, vibration, or other factors being measured exceed certain pre-established limits, as discussed hereinabove for temperature, the relevant information is supplied to the exceedance memory 235. The type of information stored relative to each exceedance, is indicated in the individual summaries associated with FIG. 14, for temperature exceedances, and for FIG. 15 for torque exceedances.

In this implementation, the analog-to-digital converter has 12 binary digits or bits output in order to provide an accurate representation in digital form of a wide range of input voltages. The 10-volt reference voltage source 234 is provided to accurately calibrate or insure the accuracy of the analog-to-digital converter 204. In accordance with conventional practice in the use of thermocouples, the cold junction 236 is connected to circuit 200 to provide cold junction compensation. More specifically, the thermocouple is formed of two dissimilar metals which provide a voltage which increases as the temperature is raised. The resultant voltage which is sensed from the thermocouple depends in part on the temperature of the cold junction of the two materials of which the thermocouple and the amplifier input connections are formed. Because the ambient may vary over a substantial range, this cold junction compensation is required, with techniques for implementing it being well known in the field.

The steps of operation of the computer 186 are controlled by the program memory 240 which is known in the industry as a "PROM" or Programmable Read-Only Memory. The contents of the PROM 240 involved detailed program steps, which are unique to the architecture of the microcomputer 186 which is being used. However, the over-all mode of operation of the microcomputer 186 under control of the PROM 240 is indicated in FIGS. 17 and 18 of the drawings, to be described in greater detail hereinbelow.

The circuit 242 is a non-volatile "shadow" "RAM". Random access memories of this type are available from Hughes, Intel, National Cash, or Zicor, for example. They include a rapid access memory section, and may on command transfer all of the information to the non-volatile permanent memory section of the unit. The shadow RAM 242 is employed to hold the working information relative to engine; and may be transferred and recalled in mass between the non-volatile section and the rapid access section, thereof.

An additional exceedance memory circuit 235 is also provided for association with the microcomputer 186. This circuit 235 is a relatively large memory which can include 4,000 or 8,000 bytes of digital information. The exceedance memory 235 records individual items and it is not rewritten.

Additional circuits included in the system of FIG. 9 include the real time clock 244 and its associated battery back-up 246. The real time clock may either provide calendar data and hours and minutes, or may be operative only when the turbine engine is in operation to provide "engine time" identification of each exceedance, as shown for example in FIGS. 14 and 15.

The system of FIG. 9 is coupled to the "outside world" via the driver circuit 248. When command signals are received from external circuitry as indicated in FIG. 10, on lead 250, the appropriate data is obtained by the microcomputer 186 from the memory 234 or 242, and transmitted over bus 252 to driver 248 wherein the data is amplified and sent out from the system of FIG. 9 on lead 254.

Concerning power for the system of FIG. 9, 28 volts direct current from the aircraft power system is supplied on leads 256. Suitable transient protection, incuding appropriate filtering circuitry 258 is coupled between the power input lines 256 and the power supply 260. The power supply 260 steps the voltage 256 down to lower voltages appropriate to power the components included in the data processing circuit of FIG. 9. These lower positive and negative voltages appear at leads 262 designated V Plus and V Minus. In order to avoid the loss of stored digital information, the circuits 264 and 266 are provided. In accordance with one function performed by the logic circuit 266, the microcomputer 186 is provided with a signal indicating loss of power. In addition, through lead 268 a special source of power, such as a large capacitor, is coupled to the non-volatile shadow RAM 242 to continue the transfer of digital information stored in the volatile rapid access portion of the memory unit into the non-volatile permanent side of the storage unit, although the other operating power is lost.

Figure 10:
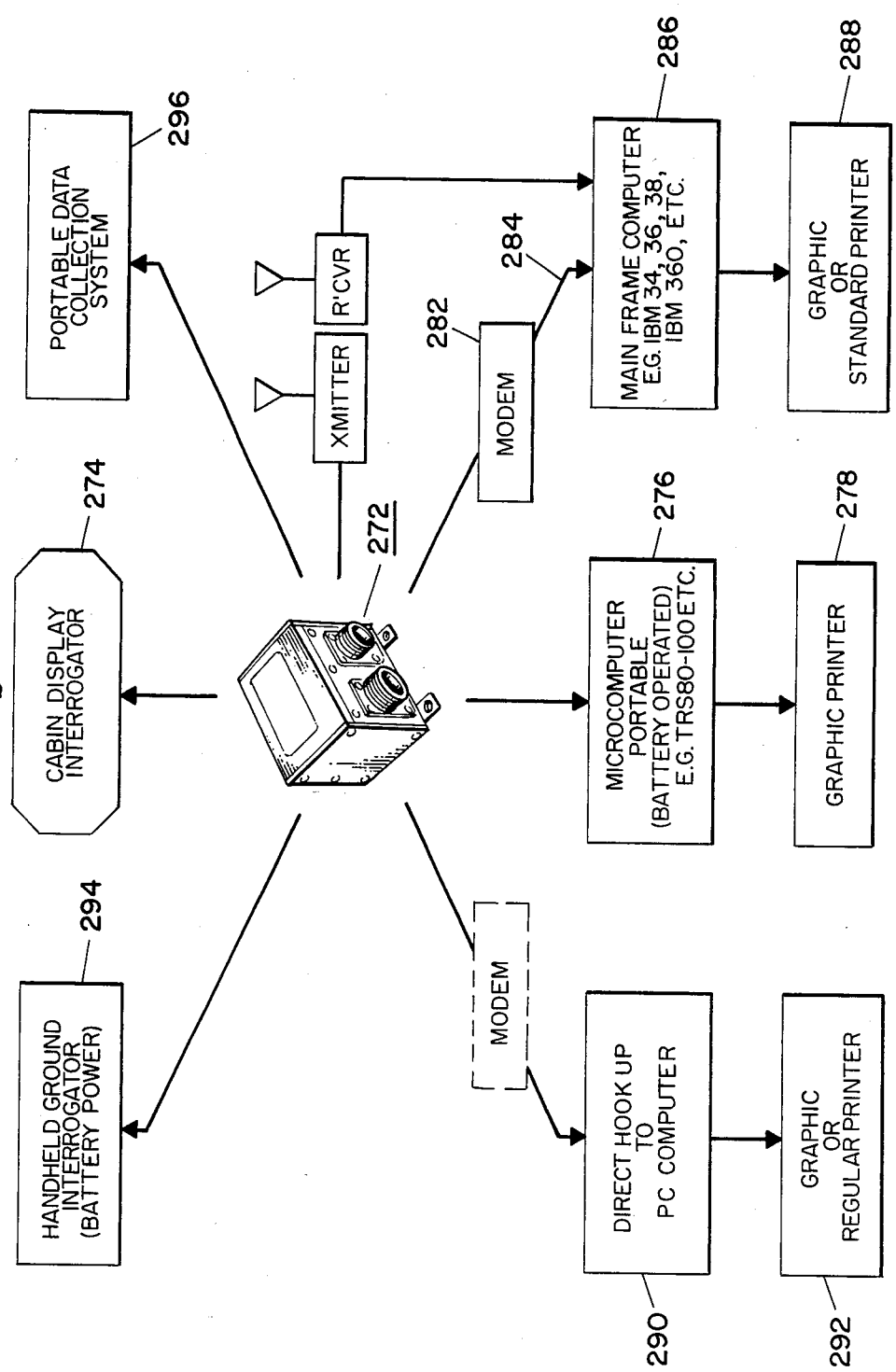
FIG. 10 is a system diagram showing the coupling of the stored information to remote data processing and/or display or graphics equipment.

The system of FIG. 9 is mounted within a protective metal box, such as that shown at the center of FIG. 10, and this unit may be mounted within the engine compartment, and in the case of multiple engine aircraft, one such unit may be associated with each engine.

FIG. 10 is a schematic showing of various types of equipment with which the system of FIG. 9 may be used. For convenience, the system of FIG. 9 is shown in the center of FIG. 10 as unit 272. It will normally be connected directly to a cabin display and interrogator unit 274 which is shown to an enlarged scale in FIG. 11. Incidentally, it is again noted that the signals requesting information from the microcomputer 272 may be applied over lead 250 of FIG. 9, and the digital information supplied in response to the request, is provided on output lead or bus 254.

Figure 13:
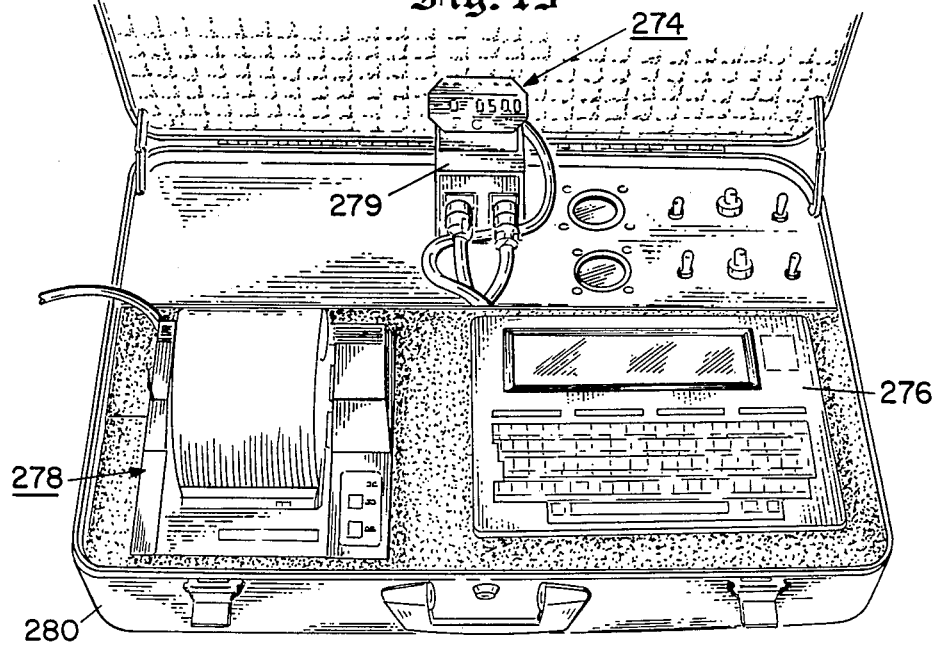
FIG. 13 shows a portable data collection and display unit.

Digital information relating to the history of the operation of any of the engines may also be supplied to units 276 and 278 which are shown in greater detail in FIG. 13. They include the Radio Shack Microcomputer TRS-80-100 as unit 276 and an associated Radio Shack graphic printer 278. As indicated in FIG. 13, these units may be mounted in a single portable carrying case or suitcase 280 which may be battery powered, to also supply power to operate unit 272, including the system of FIG. 9, even when the aircraft is not supplying power to the system.

Information may also be supplied to a modem 282 and over a telephone line 284 to a remote main frame computer 286 such as the IBM computers listed in FIG. 10. Of course, associated with a main frame computer could be a graphic or standard printer as indicated by block 288 in FIG. 10.

As another alternative or concurrent arrangement for interrogating and receiving data from the unit 272, a direct hookup to a PC Computer, such as the IBM PC Computer, is indicated at reference numeral 290, and of course, an associated graphic unit or conventional printer 292 may also be associated with the personal computer 290. If desired, a hand-held ground interrogator 294 may be employed to receive information from the unit 272 and store it for subsequent transfer to a display or data processing system. In this way, when an aircraft is on the ground being serviced between flights, the information may be "dumped" into the interrogator unit 294, and subsequently utilized and examined in detail under more leisurely conditions. One typical interrogator is the GR Electronics Model 42C or equivalent, which may be employed as the unit 294. A final alternative is that indicated by block 296 wherein a portable data collection system is shown, which could include battery powering of both for operation of the data collection system and also to power the unit 272.

Figure 11:
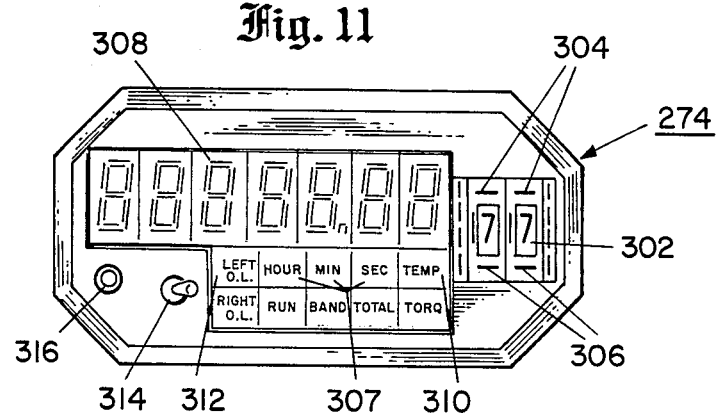
FIGS. 11 and 12 are front and side views, respectively, of a cockpit mounted display unit which may be employed as part of the system.
Figure 12:
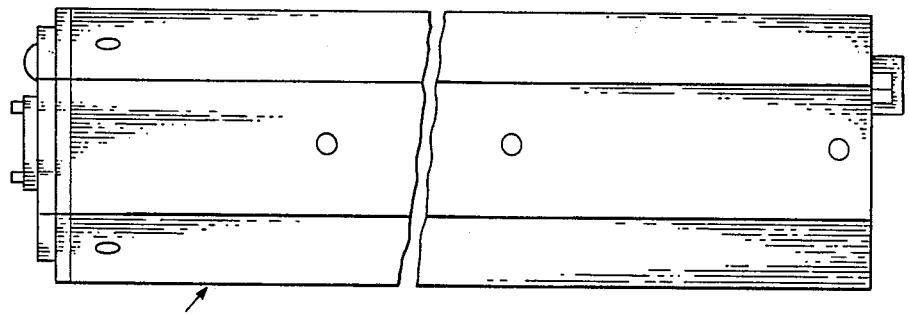

Referring now to FIGS. 11 and 12, they show a front and a side view of the engine-mounted cabin display interrogator 274. To the right in FIG. 11 are the channel number indicators 302, and both the tens digit and the units digit have switches 304 for incrementing the channel numbers in the positive direction and switches 306 for incrementing the channel numbers in the opposite direction. A 7-digit display 308 shows the channel (verified) and the information which has been requested by setting the channel display 302. Thus, channel 8 might represent the time that the left engine, of a two-engine plane has been over a predetermined temperature level, which is above the normal rated temperature for a particular turbine engine. The display 308 would then indicate the time (seconds, minutes or hours) as requested, and one of the indications 307 would be illuminated to indicate the time units being displayed. Other channels may display the actual engine operating parameters as requested. When channel selector 302 is switched to this channel, this display 308 would read the temperature in degrees centigrade, the LED behind the temperature legend 310 would be illuminated and the light 312 identifying the left engine, for example, would also be energized. By switching the switches 304 and/or 306, different channels of information may be selected relating to torque, temperature, vibration, engine speed, or other factors, either giving total times, or the times beyond permissible time intervals in various overlimits channels or bands, as may be desired.

The switch 314 may be provided for actuation by the pilot to sample data for trend monitoring purposes, as discussed in greater detail below. It is normally desirable to defer data sampling for trend monitoring until the aircraft has been in flight for a reasonable period of time and stable engine equilibrium and flight stability has been established. The reference numeral 316 in FIG. 11 identifies the ambient light sensor which controls the visual brightness of the displays items 308, 307, 310, 312.

FIG. 13 shows a portable A.C. operated unit, primarily for demonstration purposes, corresponding to the system shown at 276 and 278 in FIG. 10. The engine recorder 279 is shown as a source of signals for the display and computer equipment 276, 278 and 279. In addition, a cabin display interrogator unit 276 is included in the portable arrangements, to permit verification of the operation of the system of FIG. 9 in response to commands given from the unit 274, as well as to interrogations from the portable microcomputer 276 and the associated graphics output unit 278.

Figure 14:
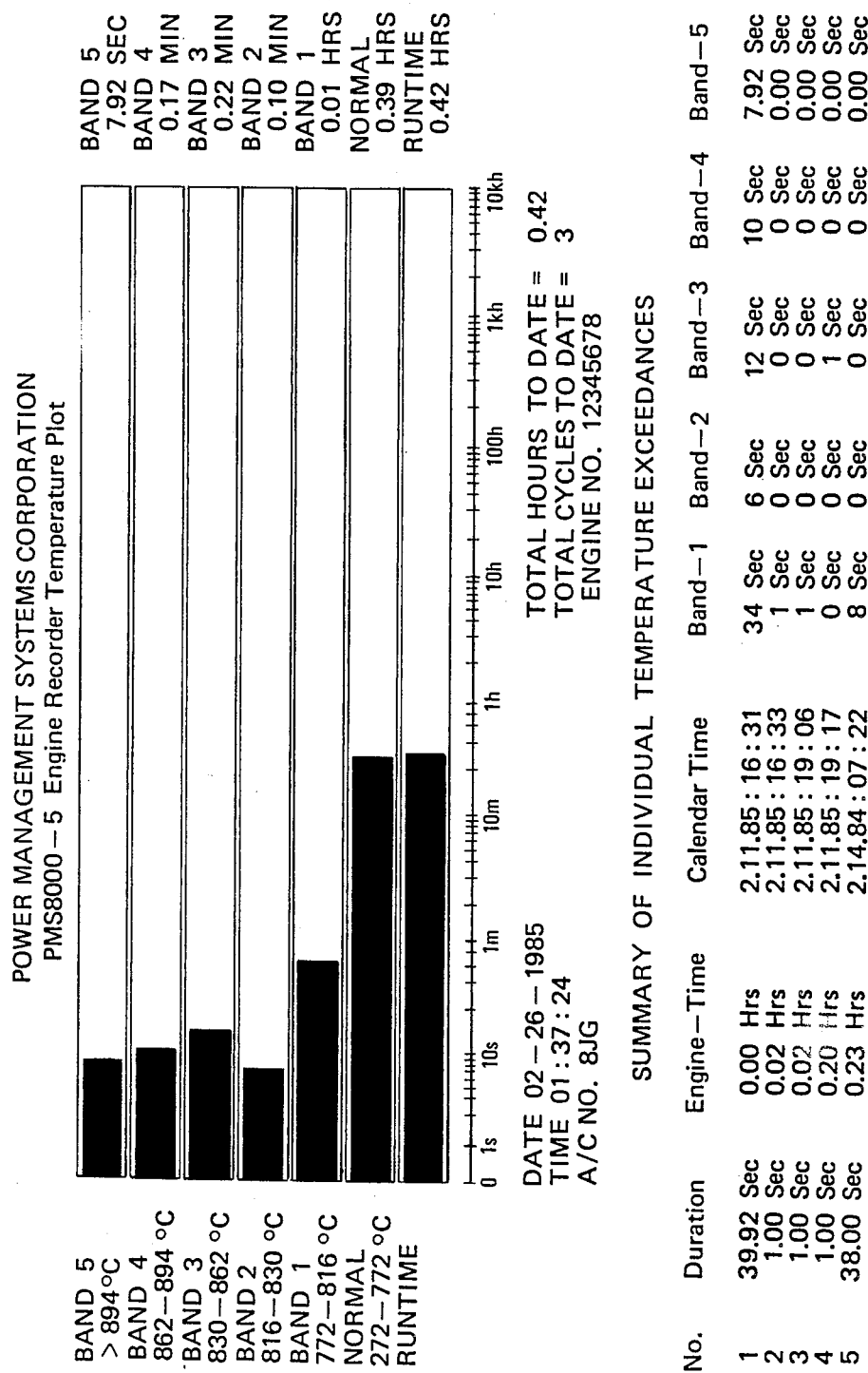
FIGS. 14 and 15 are plots of total exceedances and tabulations of individual exceedances for temperature and torque, respectively.
Figure 15:
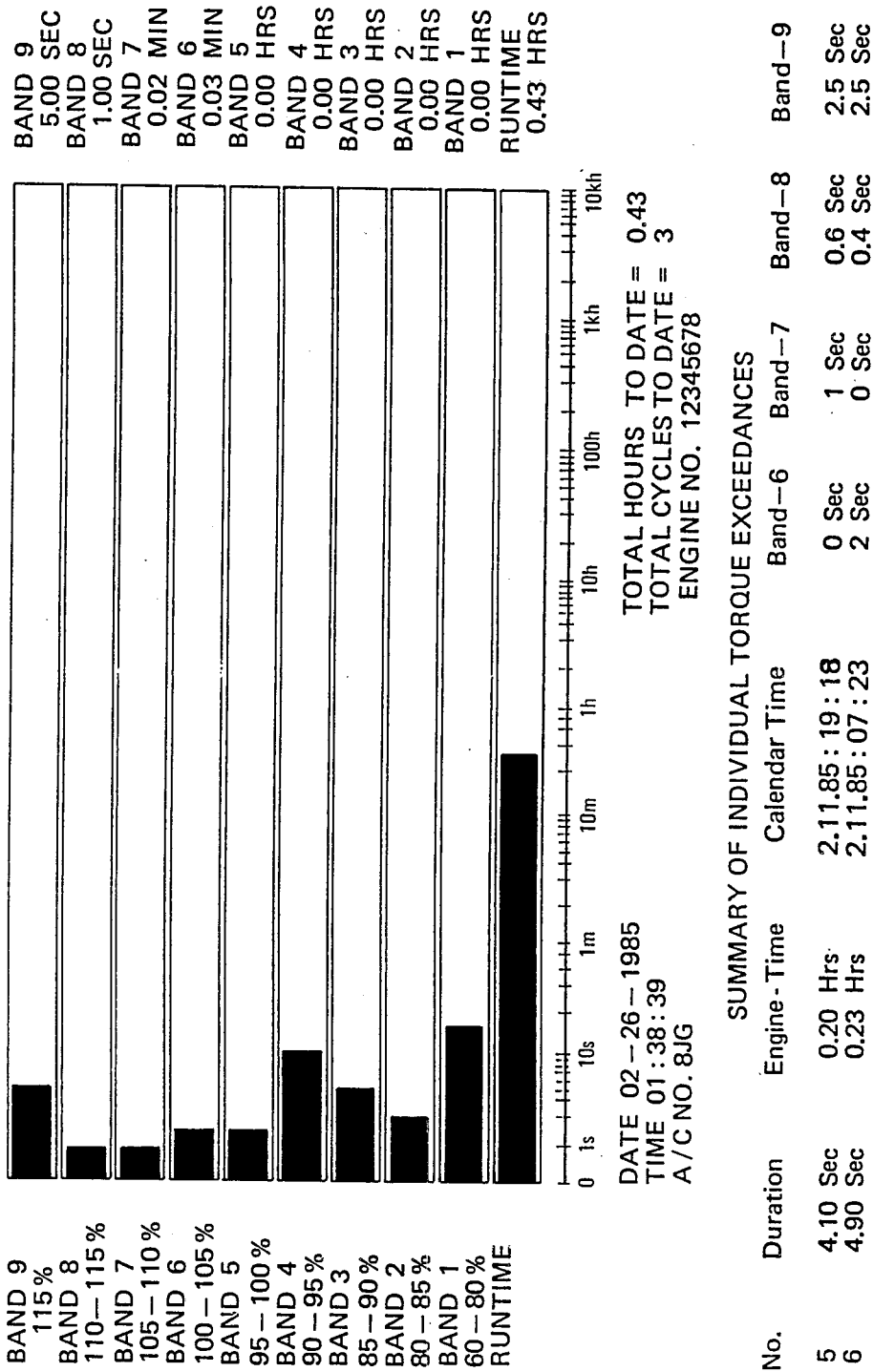

FIGS. 14 and 15 are reproductions of actual charts produced by the Radio Shack graphics printer 278. FIG. 14 relates to temperature exceedances, and FIG. 15 relates to torque exceedances. Referring to FIG. 14, it shows in its upper section, the summaries of exceedances, with the various temperature bands being listed to the left of the plots, and the totals represented by each bar graph being set forth to the right of the actual graphics display. It may be noted that the time chart is logarithmic, having the effect of expanding the shorter duration, higher temperature exceedances so that they may be readily observed, while the lower temperature, longer exceedances may also be accurately determined from the bar graphs. Immediately below the bar graphs are summary data indicating the time when the information was obtained, and other key parameters such as the total hours of running time for the engine and the total number of cycles for the engine. In addition, the engine and aircraft numbers are listed to avoid possible improper association of the tabulated data with the wrong aircraft or the wrong engine. The individual temperature exceedances are listed below so that they may be reviewed individually. The reason for this capability is that, in some cases, a series of exceedances beyond the time permitted by the manufacturer, such as four exceedances of one minute each, might not do as much damage as a single exceedance of four minutes. Accordingly, it is desirable to be able to identify the particular exceedance with a high degree of precision to determine the reason for the exceedance, and whether it was justified. Thus, where overhauls of turbine engines cost many thousands of dollars for each overhaul, it is most important for management purposes to control and hopefully eliminate as many exceedances as possible. Further, the knowledge that exceedances will be recorded and pinpointed as to time and date is likely to have a desirable effect on pilots who might otherwise push the aircraft engines beyond their rated temperature or torque limits.

FIG. 15 is similar to the showing of FIG. 14, except that it relates to torque and torque exceedances instead of to temperatures.

Figure 16A:
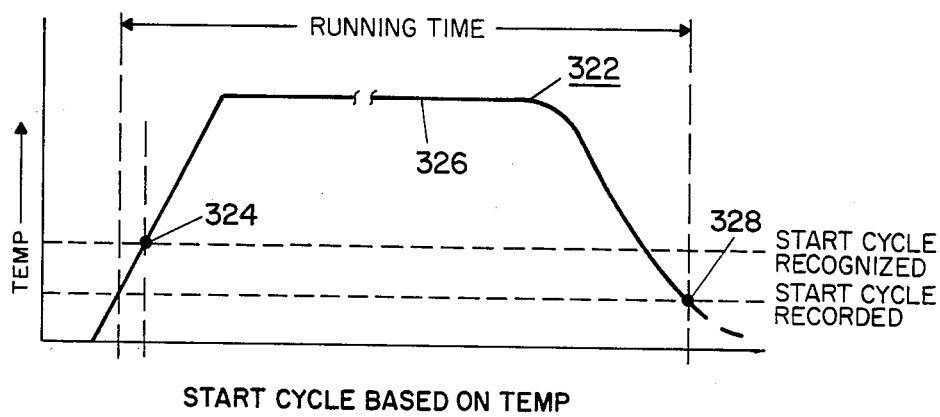
FIGS. 16A-16C are graphs showing how start and power cycles are determined.
Figure 16B:
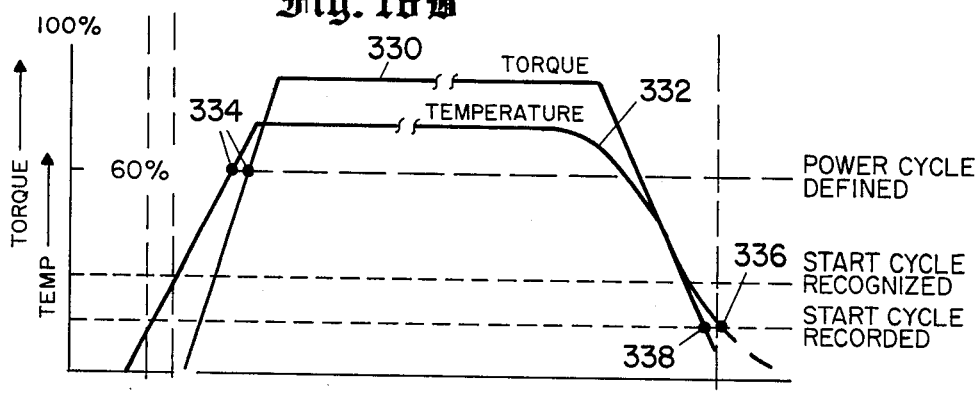
Figure 16C:
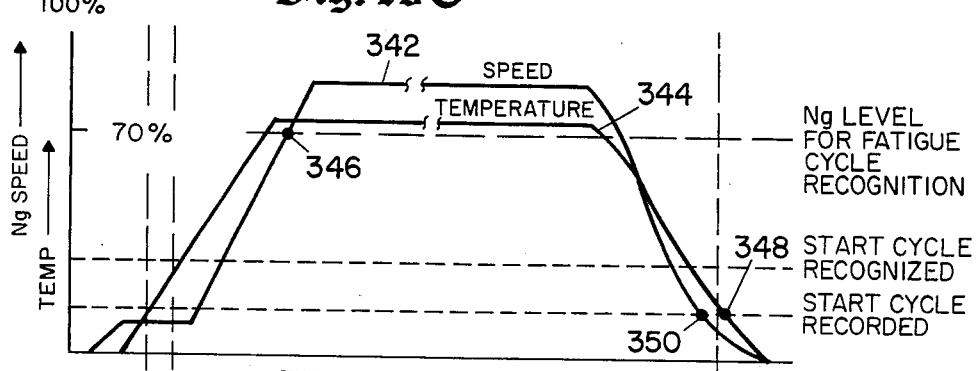

FIGS. 16A, 16B, and 16C relate to the determination of engine cycles. Various types of engine cycle determinations are available and the actual type used would be specified by the engine manufacture. These different types of cycles include "start" cycles, "power" cycles, and "fatigue" cycles. FIG. 16A is a simple plot showing a temperature characteristic 322 which rises through a basic temperature level at point 324, runs for a period of time as indicated by the substantially horizontal temperature characteristic portion 326, and then drops through a low temperature point 328 when the engine is turned off, and the engine temperature returns toward the ambient. The microcomputer recognizes the start cycle at point 324, and records the completion of a cycle when the engine temperature passes through point 328. The number of starts is one of the permanently recorded items which is stored in the non-volatile shadow RAM 242 of FIG. 9. When another start cycle is completed, the number stored in the random access memory 242 is withdrawn and incremented to the next higher number and replaced in storage.

FIG. 16B shows a torque characteristic 330 in addition to the temperature characteristic 330 which is similar to the characteristic 322 of FIG. 16A. A power cycle may be defined by the fact that the torque cycle 330 passed through the point 334 representing 60 percent of the normal full allowed power level of the engine. The completion of a power cycle may be identified by the time the temperature or torque drops below a certain predetermined level, such as point 336 on the temperature cycle, or point 338 on the torque characteristic.

FIG. 16C shows a speed characteristic 342 superposed upon a temperature characteristic 344, which is similar to the plots 322 and 330 of FIGS. 16A and 16B, respectively. When the speed exceeds 70 percent of the rated normal maximum speed of the engine, as indicated by the poit 346, a fatigue cycle is recognized. When the speed or the temperature drop below a predetermined levels such as that indicated by the point 348 on the temperature plot, or 350 on the speed plot, the fatigue cycle is recorded. Both power cycles and fatigue cycles may be recorded in the non-volatile store 242, and called up or printed out, upon demand, when suitable signals are applied to lead 250 requesting such information.

Attention will now be directed to the following Table III which gives the overall mode of operation of the system of FIGS. 9 and 10; and to the remaining figures of the drawings which go into somewhat greater detail as to the mode of operation of the system of FIGS. 9 and 10 in terms of program steps, method of analysis, and the like.

TABLE III

OVERALL MODE OF OPERATION OF SYSTEM AND FIGS. 9 AND 10

1. Start recognition and recording.
2. Sample and store all input digital data at 10 millisecond intervals.
3. Sample and store all related input data at 10 millisecond intervals.
4. Check for exceedances
   (A) Temperature
   (B) Torque
   (C) Speed
   (D) Vibration
5. Store data on all exceedance initiations.
6. Update all running totals in permanent storage.
7. Shift data on individual exceedances to permanent storage upon completion.
8. Output information as requested, i.e., every two seconds for cockpit display.

9. Check for data interrogation request, and display or transmit any requested information.
10. Trend monitoring data
   A. Record trend data upon trend initiation command either automatically or from the external pilot command.
   B. Calculation and permanent storage of variances.
11. Engine history data plots and print-out.
   A. Starts.
   B. Run Time.
   C. Exceedances: (1) torque, (2) temperature, (3) speed and (4) vibration.
      (1) Totals
      (2) Details on individual exceedances
   D. Totals relating to both type of exceedance, and level of exceedance, such as different temperature bands.
12. Engine trend monitoring data
   A. Plot variances
   B. Interpretation The foregoing Table III is substantially self-explanatory, and in the following more specific program charts and diagrams which are included in the drawings, various steps which are generally set forth in Table III will be developed in greater detail.

Figure 17A:
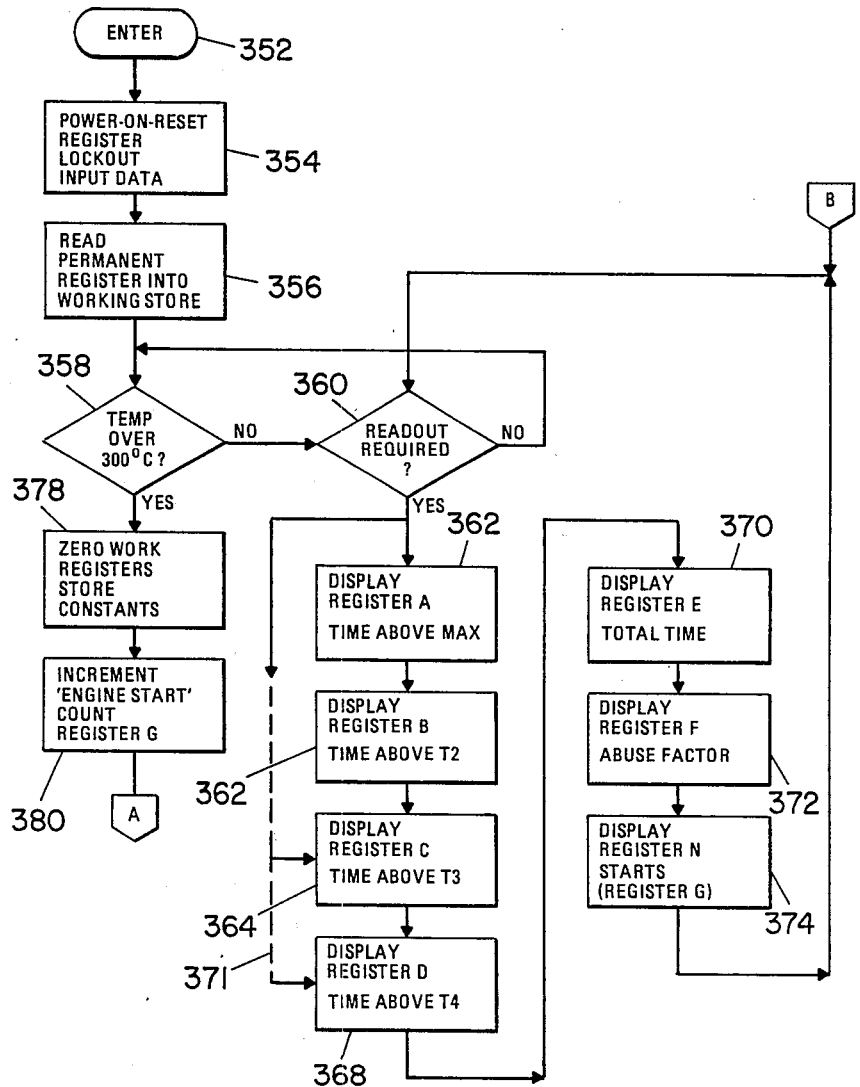
FIGS. 17A-B and 18 are charts indicating the steps of operation of the system of FIGS. 9 through 13.
Figure 18:
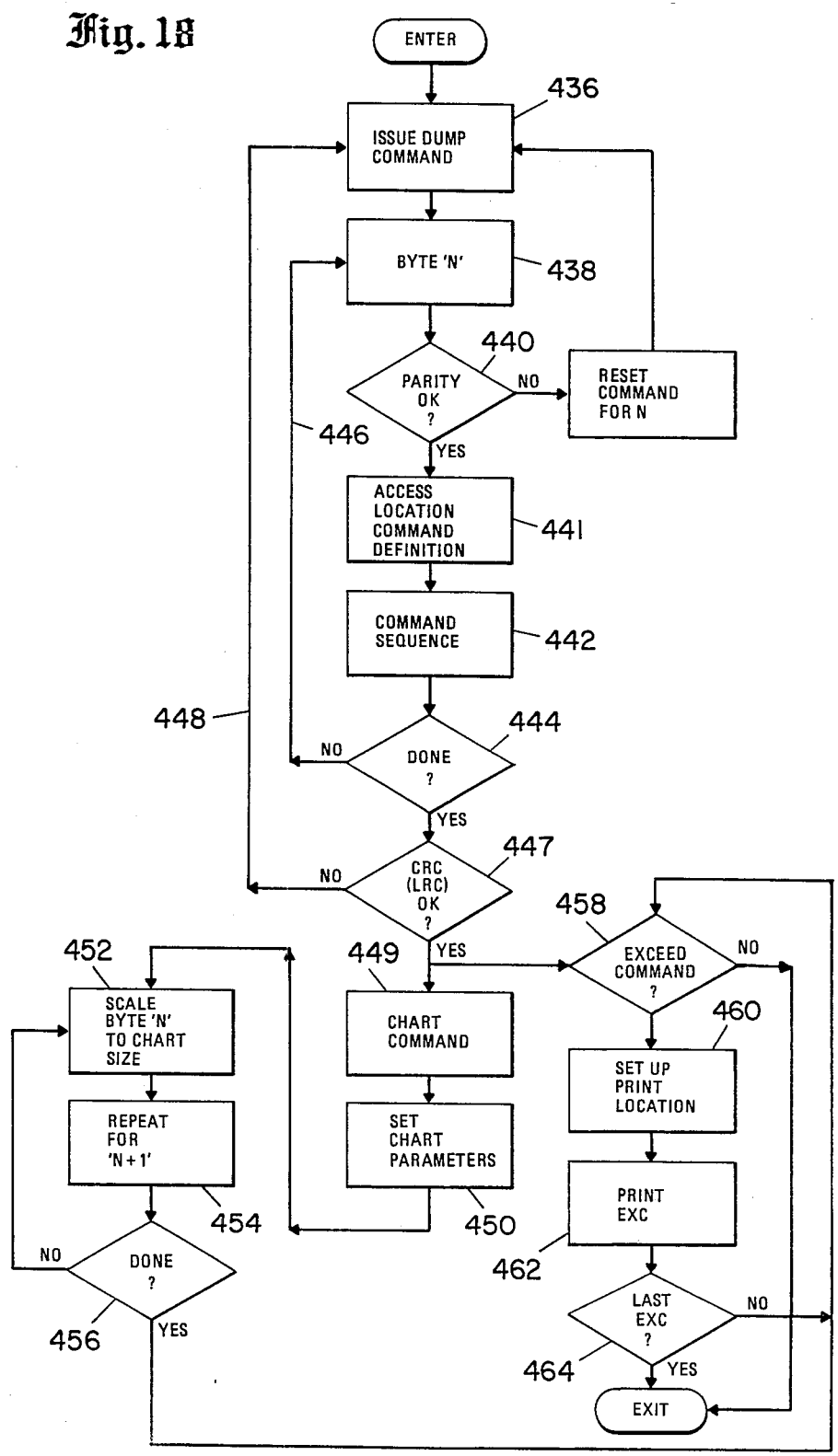

With reference to FIG. 17A from the starting point indicated by block 352, initialization is established as indicated in block 354, and as an initial step, the information in the permanent portion of the shadow random access memory of FIG. 9 is read into a rapid access working store associated with the microcomputer, as indicated by block 356. The decision diamond 358 asks the question, "Is the temperature over 300 degrees C.?", essentially determining whether the engine is running or not. If the answer is "No", the decision diamond 360 asks whether any read-out has been requested, such as an input signal from units shown in the periphery of FIG. 10. If there has been no request for a readout of information, the system cycles back to the block 358.

Returning to block 360, if there has been a readout requested, it would be in the form of a digital number requesting certain types of information from the permanent store, applied on lead or bus 250 of FIG. 9. A typical request might be for all temperature exceedance data, or all torque exceedance data, in which case the data shown in FIGS. 14 and/or 15 would be "dumped" or transmitted to the outside equipment where it would be processed to produce the graph shown in FIG. 14 or the transmitted data would be otherwise processed. Alternatively, the command could be to dump or transmit the entire contents of the permanent store, which would include the trend monitoring data, as discussed in greater detail elsewhere herein.

The cockpit signals from the manually set display 302 (see FIG. 11) are initialized by the cockpit display unit at least once evry two seconds, and the cockpit display is updated to conform to the requested information.

In the right-hand side of FIG. 17A, a typical program flow, the various blocks indicate some of the information stored in the registers A through F . . . N of the shadow RAM permanent store of FIG. 9. Thus, block 362 represent the register for storage of the total time the engine has been operated over the maximum time recorded by the system, which in the present case is 849.3 degrees C. Block 364 represents the time above T-2 which is the second temperature level below the maximum level indicated by block 362. Similarly, the blocks 366 and 368 represent the lower limits of additional time bands. In the event the cockpit display or the external command requests the time above temperature T-3, the read-out would immediately provide the requested information, as indicated by dashed line 371 indicating alternative program steps. Additional blocks shown in FIG. 17a include the total run time indicated by block 370, and abuse factor register 372, and register N designating by block 374 which lists the total engine starts. A large number of permanent storage registers are available, and the contents of a number of these storage registers are listed in Table IV set forth below. Following the dumping of the contents of the selected registers, the system cycles back to block 360.

Now, returning to the question block 358, if the temperature is over 300 degrees C., indicating that the engine is operating, a "Yes" answer leads to block 378 indicating that the working registers for receiving new analog data are cleared, and that the constants employed in normalizing or changing the raw input data into usable numerical form are stored, for each input signal. Block 380 indicates the incrementing of the "engine start" counter which may, for example, be stored in Register G, or block 374 shown to the right in FIG. 17A.

TABLE IV

LIST OF REGISTER CONTENTS

Permanent, Non-Volatile Storage

1. Total time over T-Max
2. Total time over T-2
3. Time over T-2 beyond limits
4. Total time over T-3
5. Time over T-4 Beyond limits
6. Total time over T-4
7. Total run time
8. Number of starts
9. Number of power cycles
10. Number of fatigue cycles
11–16. Set of torque totals similar to temperature bands
17–22. Set of speed totals similar to temperature bands
23–32. Details of each of last group of temperature exceedances
33–42. Details of last ten torque exceedances
43–52. Details of last ten speed exceedances
53–62. Details of last ten vibration exceedances
63–99. Trend monitoring variances for (A) temperature, (B) Ng Gas generator speed, and (C) Fuel Flow.

Figure 17B:
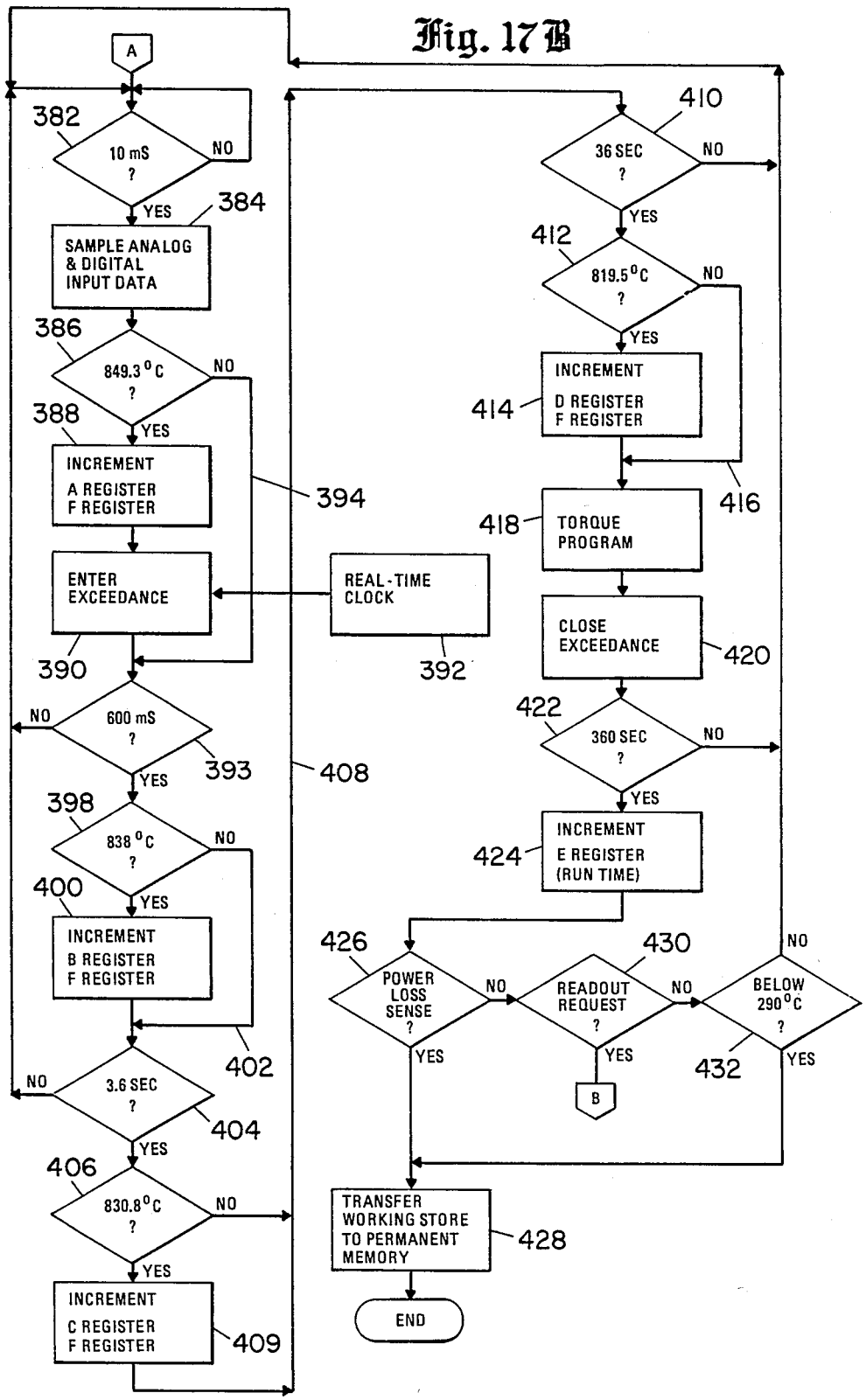

The symbol A in an arrow, at the lower left in FIG. 17A, indicates a transition from FIG. 17A which is on one sheet, to the same function point on FIG. 17B which is on the next sheet.

The question diamond 382 in FIG. 17B asks whether the ten millisecond interval between the sampling of the input data which appears to the left in FIG. 9, has elapsed. In this regard, it has been mentioned previously, that all of the input data is sampled every 10 milliseconds or every 100th of a second. Accordingly, if 10 milliseconds have elapsed, we proceed to block 384 indicating sampling of all the input data which appears to the left in FIG. 9. Following the sampling function, we proceed to the diamond 386 which inquires as to whether the temperature is above 849.3 degrees C., which is the lower limit of the maximum temperature range for which measurements are taken. If the answer is "Yes", then register A, which stores the total time above 849.3 degrees C. is incremented. In addition, using an appropriate weighting factor the engine "abuse" register F is incremented, all as indicated by block 388. Incidentally one suitable circuit for calculating the abuse factor is shown in U.S. Pat. No. 3,931,619, assignee to the assignee of the present invention.

Block 390 is designated "Enter-exceedance". This indicates that the information on the exceedance is being stored, and the "real time clock" 392 block indicates that the time and date of the start of the exceedance is being recorded.

A "No" answer to the question of the temperature level posed by diamond 386 is indicated by the path 394 which extends around blocks 388 and 390 to the diamond 393 which asks the question, "Have 600 milliseconds elapsed?". This is the time interval for sampling at the lower temperature of 838 degrees C. indicated by the diamond 398. Incidentally, the 600 millisecond interval indicated by block 393 is contrasted with the 10 millisecond interval of block 382, which is associated with the higher temperature levels. Incidentally, this carries through in connection with the display shown in FIG. 11, wherein different scales are employed for the displays at different temperature levels, with the times factor of seconds, minutes or hours being indicated, all as discussed hereinabove. Incidentally, the time scale and severity indexes associated with this abuse are factors provided by engine manufacturer.

If the inquiry about the temperature level of 838 degrees C. posed by the diamond 398 is answered in the affirmative, block 400 indicates incrementing of the B and F registers, with the B register relating to the 838 degree temperature level, and the F register being the abuse factor register. A negative answer to the inquiry leads to the path 402, is similar to the path 394, whereby the incrementing of the appropriate registers is bypassed. Diamond 404 inquires as to whether 3.6 seconds have elapsed. This is the time interval at which the lower temperature of 830.8 degrees C. involving diamond 406, is sampled. As in the prior case, a "No" answer will cause recycling along the path 408 to the diamond 382 at the upper left-hand side of the drawing sheet on which FIG. 17B appears. A "No" answer to the temperature inquiry represented by diamond 406 leads to a bypassing of the increment step 409 and to the cycle associated with the next lower temperature level, involving diamonds 410 and 412. Again, if 36 seconds have not elapsed, recycling to diamond 382 occurs, and if the temperature is not at least as high as 819.5 degrees C., the incrementing register block 414 is by-passed along path 416. The block 418 indicates that a similar cycle relative to torque and speed exceedances is now accomplished. Block 420 designated "close exceedance" indicates that the temperature, torque and speed, have all dropped below the manufacturer's maximum ratings, for normal operation, and the exceedance may therefore be closed.

The total run time of the turbine engine will normally be a relatively large number as compared with the time above the manufacturer's limits, and accordingly, the time interval of 360 seconds or six minutes is established by the diamond 422 associated with the incrementing of the run time register, as indicated by block 424. If 360 seconds have not elapsed, the program recycles to the diamond 382 at the upper left in FIG. 17B. Following incrementing of the run time register, we proceed to diamond 426 inquiring as to whether there has been a power loss. A "Yes" answer means that data in the temporary store of the microcomputer should be shifted to permanent memory for permanent retention and this is indicated by the block 428. Diamond 430 asks the question as to whether or not there has been any read-out request, and if so, we shift to the point indicated by the arrow B at the upper right-hand side of FIG. 17A. The next inquiry indicated by diamond 432 is whether the temperature of the engine is below 290 degrees C., indicating that the turbine engine has been turned off. An affirmative answer to this inquiry again leads to block 428, the transfer of the information from the working store to permanent memory.

Now, turning to FIG. 18, this drawing relates to the steps involved in FIG. 10, where information is being transferred from the circuit of FIG. 9 to other units. Let us initially assume that it is desired to print out charts and exceedance data such as those shown in FIGS. 14 and 15 through the use of the units 276 and 278 as shown in FIG. 10. The first step is the issuance of a "dump" command, as indicated by block 436 in FIG. 18, and this command would be routed to the circuit of FIG. 9 on the input lead 250. Information in the form of a series of "bytes" of binary information would then be transmitted over lead 254 of FIG. 9 to the microcomputer 276, as indicated in FIG. 10, and this is indicated by block 438 in FIG. 18. The diamond 440 asks whether the parity check of the transmitted information is "okay" or not. Of course, parity is a method of error checking whereby one or more additional bits of information are added to the data byte to indicate, for example, whether the number is an odd number or an even number, or whether certain digits thereof add up to an odd or even number, all of which is well known per se. The external computer 276 of FIG. 10 must store the received information in a particular address location in its store, indicated by block 441 and the operator must indicate what he wants to have done with the received information, and the formulation of the sequence of steps to implement the desired command, is indicated by the block 442.

The diamond 444 inquires as to whether the steps set forth above have been accomplished in accordance with the capabilities or system built into the computer so that the computer knows what it is to do. A "no" answer recycles the program along line 446 to block 438. However, if the command sequence is an appropriate one acceptable and within the framework which may be implemented by the computer, we proceed to the diamond 447.

In diamond 440 discussed above, a simple byte-by-byte parity check was accomplished and any byte which did not satisfy the parity check was re-ordered. Now, in block 447 a more complete check of the input data is accomplished through the use of either a cyclic redundancy code (CRC), or a linear redundancy code (LRC), each of which involve known moderately complete redundancy checks. Thus, where two errors in transmitted data would normally not be detected by a simple parity check, such multiple errors would normally be easily recognized by a cyclic or a linear redundancy code. Again, if the redundancy codes do not check out, the information is reordered, and this is indicated by the line 448.

In FIGS. 14 and 15, a chart was prepared indicating the times in certain over limits bands, and then the individual exceedances were printed out. In FIG. 18, the chart command is indicated by the block 449, and this is followed by the block 450 designated "set chart parameters" and then the successive bytes of information are scaled to the chart size, as indicated by the block 452. This step 452 involves established the length of the bar graphs, for example, as shown in FIGS. 14 and 15. Block 454 indicates the repetition of the scaling step of block 452 for the different temperature or torque bands included in each of the graphs. Diamond 456 is a routing computer step asking whether the graph bar code drawing has been completed, and if so, this step of the program is over.

Diamond 458 inquires as to whether there is a command to print out the exceedances, as shown below the graphs, in FIGS. 14 and 15. Following such an exceedance command, the steps as indicated by the blocks 460, 462 and 464 involve setting up a print location for the first exceedance print-out, printing the exceedance, and a determination as to whether or not it was the last exceedance with a negative answer involving recycling to print the next successive exceedance.

We will now turn to a consideration of trend monitoring, by reference to FIGS. 19 through 24. FIG. 19 shows the profile 472 of a new turbine engine, indicating the temperature during a few seconds after the turbine engine is turned on; and the dashed line profile 474 indicates the temperature profile of a turbine engine following some substantial period of use at the same power level, and some degradation in the turbine engine, as the blades became worn and perhaps slightly deformed from long use or abuse. Under stable operating conditions, the arrow 476 indicates qualitatively the type of shift in the operating temperatures of the engine, while the aircraft is operating, for example, at the same speed, elevation, and under other normalized conditions. The change in the stable conditions following the passage of substantial periods of time, is indicated by the dashed line 478.

FIG. 20 is a set of plots similar to those of FIG. 19, but relating to the compressor fan speed, again with the solid line plot 480 representing the characteristic or profile of a new engine, and the dashed line 482 representing that of the engine which has been used for many months or abused for shorter periods of time. It may be noted essentially, that, as the degradation progresses, a higher rate or rotation of the compressor or fan is required, in order to produce the same power levels, and this variance is indicated by the arrow 484, where the degraded performance shows a longer time to reach operating speed and correspondingly a higher operating speed to obtain the same level of performance.

Figure 21:
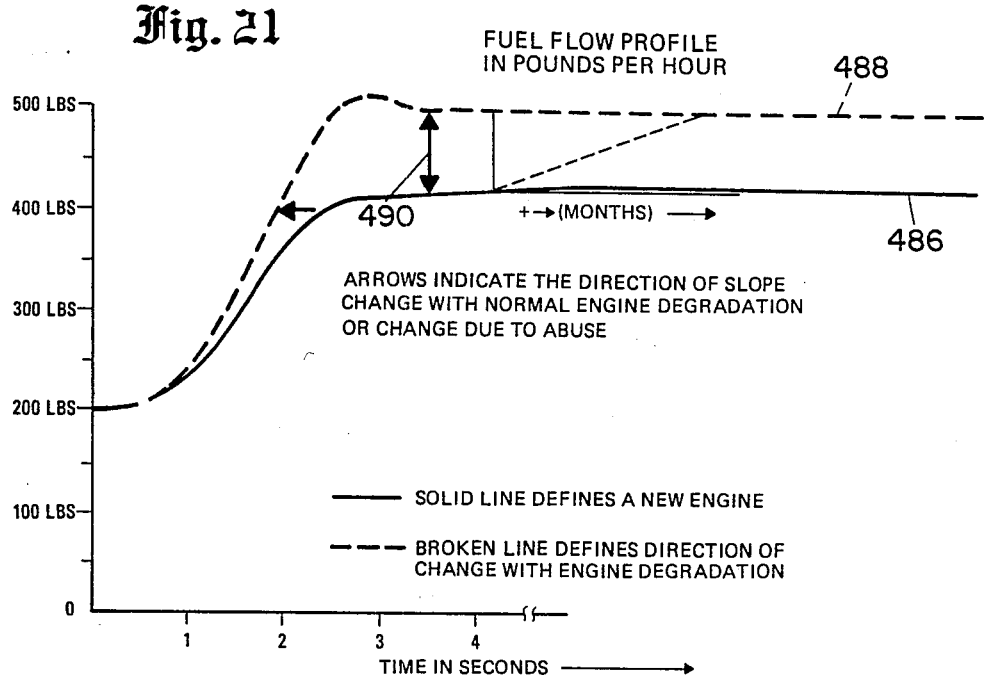

FIG. 21 is a similar graph for fuel flow, with the profile 486 in a solid line, representing the lower fuel flow for a new engine as compared with the dashed line plot 488 showing the higher fuel flow required to, produce the same horsepower for normalized conditions with a worn engine or one which has been subject to degradation. The arrow 490 indicates departure or variance in fuel flow with engine degradation.

As mentioned above, for power assurance purposes, the engine is cycled through a periodic low or fractional power cycle while the aicarft is still on the ground. The characteristics corresponding to 472 and 474 are sampled during the first few seconds of the power cycle and the amplitude of the temperature peak and the slope of the characteristic are examined to indicate the engine condition. In the event that the engines are in need of immediate overhaul, so that one engine of a two engine helicopter could not fly the craft to a safe landing, a decision may be made not to take a possible planned flight or reduce payload.

As mentioned hereinabove, the switch 314 in FIG. 11, corresponds to the input 492 in FIG. 9, and is operated by the aircraft pilot for the purpose of recording trend monitoring data after the aircraft has been warmed up and is under stable flight operating conditions. When this switch is operated, all of the data necessary for trend monitoring is recorded.

Several steps are necessary in order to convert the recorded input information into trend monitoring variances of the type indicated in FIGS. 19, 20 and 21, so that they may be plotted and employed for engine analysis purposes. The steps involved in the determination of the trend monitoring variances include first, a calculation of the actual horsepower being used under the stable operating conditions under which the data was taken, normalization of the horsepower data using a density index factor, and from this data, a calculation may be made of the idealized fuel flow in pounds per hour, the engine temperature, and the engine speed $N_g$, all on a normalized basis. These optimum figures are then compared with the actual engine speed $N_g$, the actual engine temperature, and the actual fuel flow in pounds per hour, and the variance from the normalized optimum figures are calculated.

Figure 24:
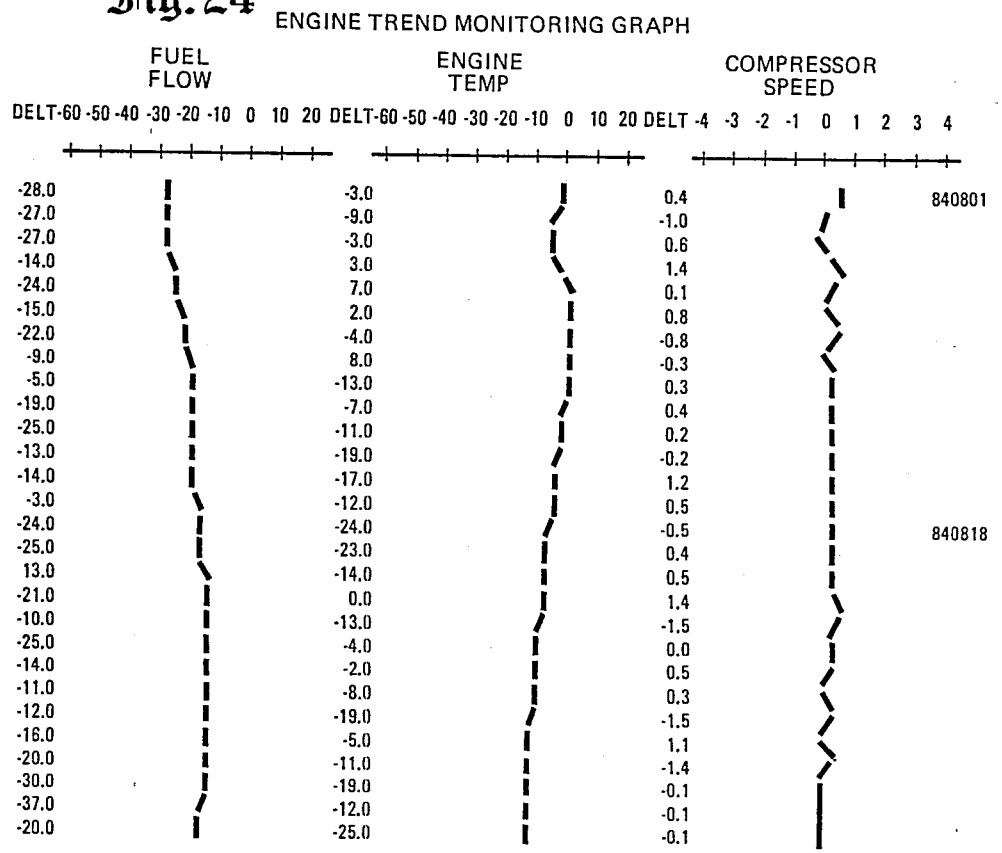
FIG. 24 is a plot of trend monitoring variances of fuel flow, engine temperature and compressor speed with time.

The variances are plotted as indicated in FIG. 24, for fuel flow, engine temperature and compressor speed. Incidentally, sometimes the initial settings of the turbine blade clearances are adjusted with relatively large tolerances. Then, as the engine heats up and some hours of flight take place, perhaps there will be some stretching and reduction in the tolerances, with the result that, with the tighter tolerances, some improvement in engine performance may be observed. However, this initial improvement normally will not last, and degradation of the type indicated in FIGS. 19, 20 and 21 will set in after substantial periods of time. One maintenance step which may produce a significant improvement in operation is the washing of the turbine blades, eliminating stray particles which may have adhered to the blades in a manner remotely similar to the way bugs may adhere to a automobile windshield. Following such a turbine blade wash, the variances will often decrease significantly.

Now that the general nature of the trend monitoring process has been discussed, we will go to one particular example involving a United Aircraft PT6A-20 engine. In this regard, attention is directed to FIG. 23 of the drawings in which the manufacturers supplied chart involving shaft horsepower, an air density index, fuel flow in pounds per hour, engine temperature and speed, is shown. In using the chart of FIG. 23, the density index is initially calculated using the known aircraft altitude, and the outside air temperature. Using known formulations, with an altitude of 19,000 feet, and a temperature of −27 degrees C., the density index factor is determined to be 0.56. It is understood that this density index relates to the ratio of the actual conditions to the Standard Atmosphere. Thus, at an altitude of 19,000 feet and a temperature of −27 degrees Celsius, the density is 0.56 that of one atmosphere, or of atmospheric pressure and density at sea levels under standard conditions.

From FIG. 9, both torque and engine speed are sampled, and the product of the torque and the engine speed is equal to the shaft horsepower. In the present case, the horsepower was calculated to be equal to 240. Now, referring to FIG. 23, the 0.56 density index line is followed by the set of arrows 502. The 240 horsepower curved line is designated by the reference numeral 504. These two lines intersect at the point 506. Now, from this intersection point, the ideal normalized fuel flow, engine temperature, and engine speed may be calculated. More specifically, the fuel flow lines run diagonally from upper left to lower right in FIG. 23, and by extending from point 506 upwardly and to the left parallel with the fuel flow lines, the arrows 508 lead us to a indication of a fuel flow figure. Extending upwardly and to the left along the line indicated by the arrows 508, it may be seen that the normalized fuel flow for the conditions provides a fuel flow of slightly less than 170 pounds per hour or approximately 168 pounds per hour. This figure is compared with the actual fuel flow as measured at input 182 in FIG. 9, and the variance is plotted at the proper date at which the reading was taken, in the left-hand plot of FIG. 24. Incidentally, in FIG. 24, successive entries may be taken on successive days of operation, or successive increments such as five-hour increments of run time of the turbine engine under consideration. The actual numbers which appear to the left are the figures represented by the lines on the plot.

Returning to FIG. 23, the horizontal line 510, accompanies by the arrows, show us the readings on the tamperature and engine speed scales, indicating the optimum engine operating temperature and engine speed, for a new engine. More specifically, the engine temperature appears to be approximately 622 or 623 degrees C., and the engine speed appears to be approximately 91.5 percent of the maximum rated speed. As in the case of the normalized fuel flow figure, these engine speed and temperature figures are compared with the actual engine speed and temperature figures as provided by the sensors at inputs as shown to the left in FIG. 9, and the variances are plotted as indicated in FIG. 24.

Figure 22:
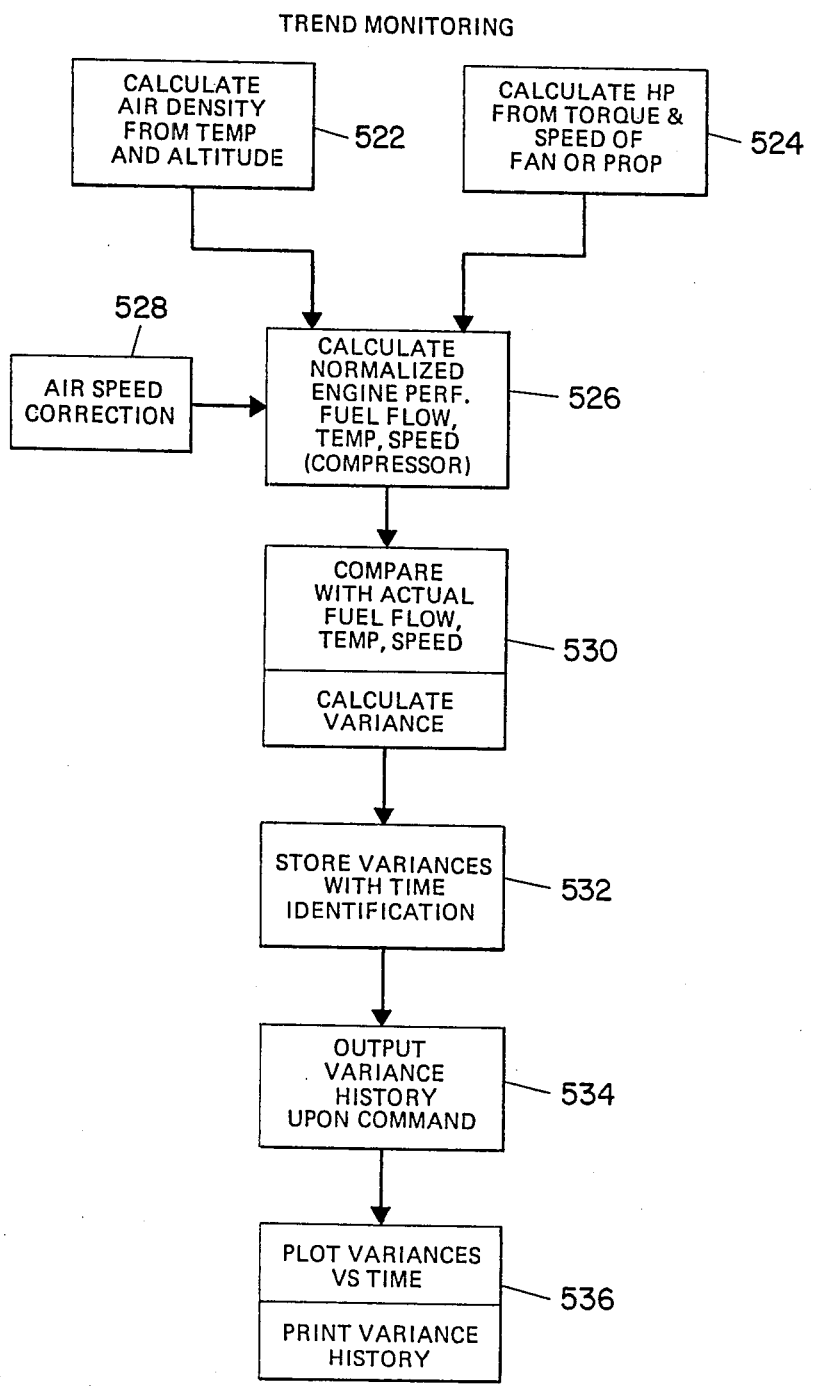
FIG. 22 is a plot of steps undertaken in trend monitoring analysis.
Figure 23:
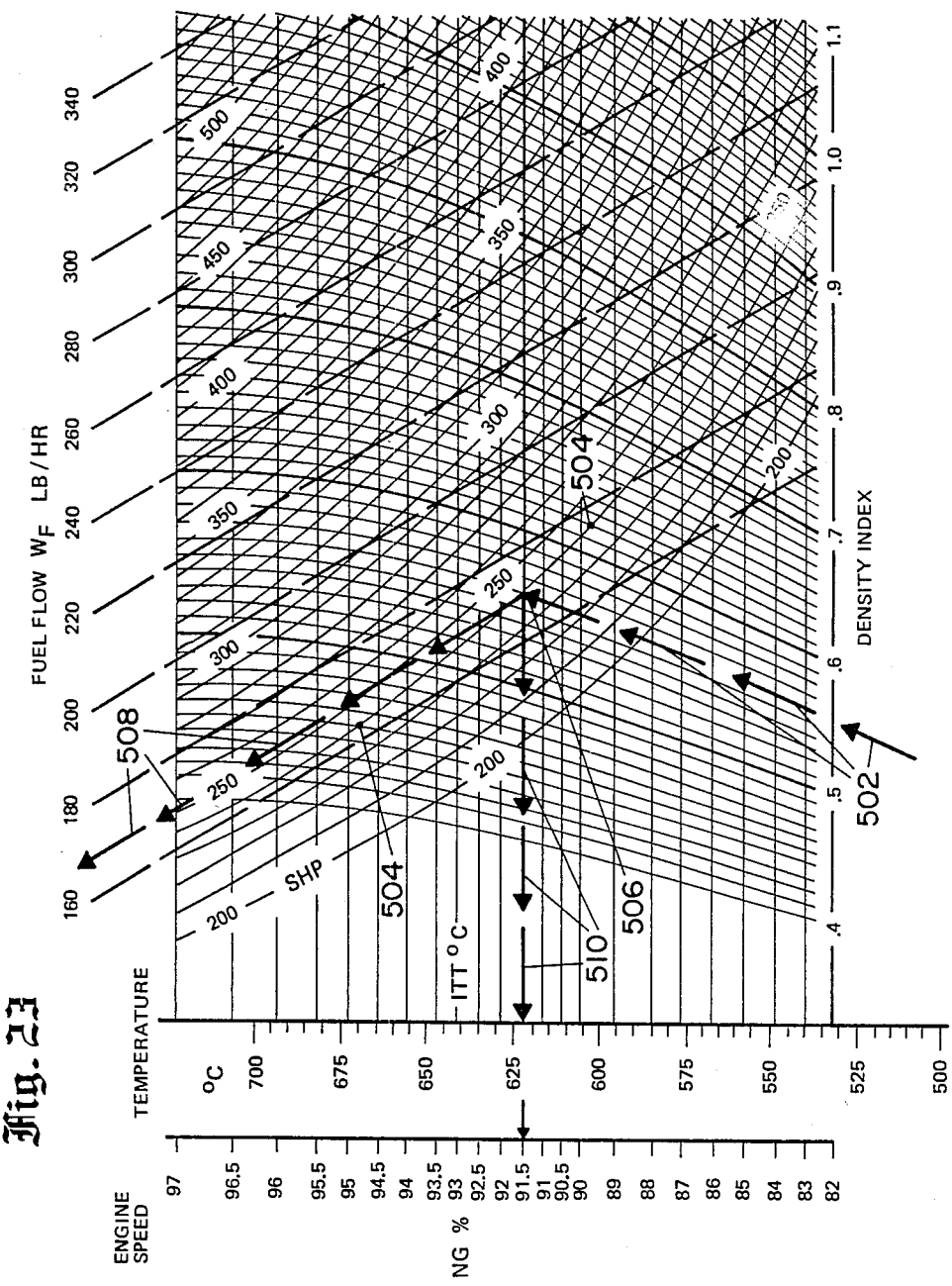
FIG. 23 is a showing of a set of plots which are manually employed in calculating engine rotation speed and fuel flow.

FIG. 22 indicates the steps involved in trend monitoring, performed "manually" or graphically, and they start with the calculation of the air density from the temperature and altitude, as indicated by block 522; and the shaft horsepower is calculated from the torque inputs and the speed of the turbine fan or the propeller in a turbo-prop engine, as indicated by block 524 in FIG. 22. The next step is to calculate the normalized engine performance in terms of fuel flow, temperature and turbine speed (gas generator Ng), as indicated by the block 526, with an air speed correction being included as indicated by the block 528. The comparison with the actual fuel flow, temperature, and speed, and the calculation of the differences in terms of the actual temperature or the percentage variance, is indicated by the block 530 in FIG. 22. The variances are then stored in the computer memory, along with an indication of the time at which the trend monitoring data was recorded, and this is indicated by the block 532. Block 534 indicates the withdrawal from storage of the variance history on command, and block 536 shows the plotting of the variances with time, as indicated in FIG. 23; alternatively, the variance history may be printed out.

In the foregoing discussion, the steps for determining the normalized fuel flow, temperature and engine speed, given the density index and the horsepower were shown, on a graphical basis. In addition, these factors may be calculated by formulas which are available for each aircraft, and are provided by the aircraft manufacturer. Of course, these formulae, although similar, differ for each type of aircraft and aircraft engine. Instead of manually following the graph lines, in connection with the showing of FIG. 23, these steps are computed mathematically, and the idealized fuel flow, temperature, and engine speed are determined from formulas. The resultant data is then compared with the actual measured data, and variances determined and stored.

In summary, therefore, the present comprehensive engine monitoring system not only provides detailed information relative to the nature of the exceedances, but also includes all data inputs required for, and the capability of trend monitoring, by calculating and plotting variations in fuel flow, temperature, and engine speed, as compared with the normalized ideal figures for a new turbine engine.

In conclusion, it is to be understood that the foregoing is a description of illustrative, preferred embodiments of the invention. Other electronic circuit arrangements for implementing the functions described hereinabove may be employed. By way of example, but not of limitation, other logic chips may be employed to implement the indicated function without departing from the spirit and scope of the invention; a series of thermocouples, resistance thermometers, optical temperature sensors, or any other means for measuring temperature, located at desired points along the turbine engine may be used instead of the schematic indication of a single thermocouple as shown in the drawing; and it is to be expected that the values as set forth in Table I and in FIG. 8 will vary from one turbine engine to another and that these are merely representative of particular engines under consideration. Also, differences in display and switching arrangements are expected between cockpit mounted and portable test units, and when one or three or four engine planes are involved, for example. It is also to be noted that all of the functions as described herein need not be included in every system; instead, it is to be expected that user requirements and needs will differ, and that most systems will use some but not all of the capabilities as disclosed hereinabove. Accordingly, the present invention is not limited to the particular systems as shown in the present drawings and as described in this specification.

What is claimed is:

1. A comprehensive aircraft turbine engine monitoring and recording system whereby said turbine engine has predetermined maximum normal operating parameters, said system comprising:
    means for sensing the speed of rotation of said turbine engine; means for sensing temperature of said turbine engine; means for sensing altitude; means for determining exceedances indicating operation of said turbine engine over the normal operating temperature and/or speed of said engine; means for determining the air speed of said aircraft;
    non-volatile storage means for permanently storing data giving the duration and magnitude of each said exceedance, and the total duration of the exceedances;
    means for recording and processing data required for turbine engine trend monitoring, including means for calculating horsepower and the air density index factor, and the resultant optimum fuel flow rate, engine speed and engine temperature under these horsepower and air density conditions;
    means for determining the actual fuel flow rate, engine speed and engine temperature;

means for determining the variances from the optimum for the fuel flow rate, the engine speed and the engine temperature;

means for numerically displaying selected data from said system;

means for mounting said numerical display means in the cockpit of the aircraft; and switching means in the cockpit for actuation by the pilot for selecting any of at least ten desired sensed or calculated information or data, to be displayed, including altitude and airspeed;

whereby said display provides a backup source of instrumentation for the pilot of the aircraft, and whereby an evaluation of the engine degradation trend may be made for purposes of power assurance, engine overhaul scheduling, or the like.

2. A comprehensive turbine engine monitoring and recording system as defined in claim 1 further including means for recording the time of occurrence of each exceedance.

3. A comprehensive turbine engine monitoring and recording system as defined in claim 1 further comprising means for permanently storing in nonvolatile storage the total running time of said turbine engine.

4. A comprehensive turbine engine monitoring and recording system as defined in claim 1 further comprising means for permanently recording the number of times the turbine engine has been operated at a predetermined level.

5. A comprehensive turbine engine monitoring and recording system as defined in claim 1 wherein means are provided for permanently recording the temperature exceedances in accordance with successive temperature bands above the normal maximum operating temperature of said engine.

6. A comprehensive turbine engine monitoring and recording system as defined in claim 1 further comprising means for selectively transmitting all or selected portions of the permanently stored data to a location spaced from said system, upon command.

7. A system as defined in claim 1 further comprising means for graphically displaying said exceedances and for printing out detailed information relating to each of a plurality of said exceedances.

8. A system as define in claim 1 including a remote computer and a graphics printer for displaying said data, and means for coupling said computer and printer to receive data from said system.

9. A system as defined in claim 6 further including a remote data processing apparatus and modem means for transmitting said data from said system to said remote data processing apparatus.

10. A system as defined in claim 1 further including means for sensing the output torque or power from said turbine engine, and means for determining exceedances indicating operation of said engine over the normal rated output torque capacity of said engine, and means for permanently recording information relative to such exceedances.

11. A system as defined in claim 1 further comprising means for establishing a plurality of levels or bands of engine operation relating to critical engine parameters such as temperature, engine speed, or torque, with such levels being closely related to the rated maximum operating limits of said engine, and means for recording the time of operation in each of said levels or bands.

12. A comprehensive aircraft turbine engine monitoring and recording system wherein said turbine engine has predetermined maximum normal operating parameters, said system comprising:

means for sensing the speed of rotation of said turbine engine; means for sensing the temperature of said turbine engine; means for sensing the output torque of said turbine engine; means for determining exceedances indicating operation of said turbine engine over the normal operating temperature, torque and/or speed of said engine;

non-volatile storage means for permanently storing data giving the duration and approximate magnitude of each said exceedance, and the total duration of the exceedances;

means for recording and processing data required for turbine engine trend monitoring, including means for calculating horsepower and the air density index factor, and the resultant optimum fuel flow rate, engine speed and engine temperature under these horsepower and air density conditions;

means for determining the actual fuel flow rate, engine speed, engine temperature;

optimum for the fuel flow rate, the engine speed and the engine temperature;

means for numerically displaying selected data from said system;

means for mounting said numerical display means in the cockpit of the aircraft; and switching means in the cockpit for actuation by the pilot for selecting any of at least ten desired sensed or calculated information or data, to be displayed;

whereby an evaluation of the engine degradation trend may be made for purposes of power assurance, engine overhaul scheduling, or the like.

13. A comprehensive turbine engine monitoring and recording system as defined in claim 12 further including means for recording the time of occurrence of each exceedance.

14. A comprehensive turbine engine monitoring and recording system as defined in claim 12 further comprising means for permanently storing in nonvolatile storage the total running time of said turbine engine.

15. A comprehensive turbine engine monitoring and recording system as defined in claim 12 further comprising means for permanently recording the number of times the turbine engine has been operated at a predetermined level.

16. A comprehensive turbine engine monitoring and recording system as defined in claim 12 wherein means are provided for permanently recording the temperature exceedances in accordance with successive temperature bands above the normal maximum operating temperature of said engine.

17. A system as defined in claim 12 further comprising means for establishing a plurality of levels or bands of engine operation relating to critical engine parameters such as temperature, engine speed, or torque, with such levels being closely related to the rated maximum operating limits of said engine, and means for recording the time of operation in each of said levels or bands.

18. A comprehensive turbine engine monitoring and recording system as defined in claim 12 further comprising means for selectively transmitting all or selected portions of the permanently stored data to a location spaced from said system, upon command.

19. A system as defined in claim 18 further comprising means for displaying selected data transmitted from said system.

20. A comprehensive aircraft monitoring and recording system for a turbine engine wherein the engine manufacturer has established certain normal maximum temperature and torque levels for said engine, said unit comprising:

means for measuring turbine engine temperature; means for measuring turbine engine speed; means for measuring turbine engine torque; means for measuring turbine engine fuel flow; means for measuring the number of times said turbine engine is operated; means for measuring the total operating time of said turbine engine; data processing circuit means for periodically sampling all of the foregoing measured quantities, and for determining when the temperature and/or torque exceeds the manufacturer's normal maximum rated temperature and/or torque figures;

means for recording the duration and approximate maximum exceedance level for each time that the turbine engine is operated beyond the manufacturer's normal rated maximum torque and/or temperature;

means for permanently storing data on (1) each exceedance, (2) engine run time, (3) the number of times the engine has been operated, and (4) total exceedance time;

means for transmitting all of selected portions of said permanently stored data to a location spaced from said unit, upon command;

means for numerically displaying selected data from said system;

means for mounting said numerical display means in the cockpit of the aircraft; and switching means in the cockpit for actuation by the pilot for selecting any of at least ten desired sensed or calculated information or data, to be displayed.

21. A comprehensive turbine engine monitoring and recording system as defined in claim 20 further including means for recording the time of occurrence of each exceedance.

22. A system as defined in claim 20 further comprising means for establishing a plurality of levels of bands of engine operation relating to critical engine parameters such as temperature, engine speed, or torque, with such levels being closely related to the rated maximum operating limits of said engine, and means for recording the time of operation in each of said levels of bands.

23. A comprehensive aircraft turbine engine monitoring and recording system whereby said turbine engine has predetermined maximum normal operating parameters, said system comprising:

means for establishing at least three levels or bands of engine operation relating to critical engine parameters such as temperature, engine speed or torque, with such levels being closely related to the rated maximum operating limits of said engine, means for recording the time of operation of said engine in each of said levels or bands;

non-volatile storage means for permanently storing data giving the duration and magnitude of exceedances when the engine is operated above said limits, and the total duration of the exceedances;

means for recording and processing data required for turbine engine trend monitoring, including means for calculating horsepower and the air density index factor, and the resultant optimum fuel flow rate, engine speed and engine temperature under these horsepower and air density conditions;

means for determining the actual fuel flow rate, engine speed and engine temperature; and means for determining the variances from the optimum for the fuel flow rate, the engine speed and the engine temperature;

means for numerically displaying selected data from said system;

means for mounting said numerical display means in the cockpit of the aircraft; and switching means in the cockpit for actuation by the pilot for selecting any of at least ten desired sensed or calculated information or data, to be displayed;

whereby an evaluation of the engine degradation trend may be made for purposes of power assurance, engine overhaul scheduling, or the like.

24. A comprehensive turbine engine monitoring and recording system as defined in claim 23 further including means for recording the time of occurrence of each exceedance.

25. A comprehensive turbine engine monitoring and recording system as defined in 23 further comprising means for permanently storing in nonvolatile storage the total running time of said turbine engine.

26. A system as defined in claim 23 including a remote computer and a graphics printer for displaying said data, and means for coupling said computer and printer to receive data from said system.

27. A comprehensive turbine engine monitoring and recording system as defined in claim 23 further comprising means for selectively transmitting all or selected portions of the permanently stored data to a location spaced from said system, upon command.

28. A system as defined in claim 27 further comprising means for displaying selected data transmitted from said system.

29. A comprehensive aircraft turbine monitoring and recording system, comprising:

an electronic data processing unit including a permanent non-volatile memory;

means for supplying to said data processing unit substantially all of the major aircraft operational data and the turbine operating parameters, for storage of this information by said data processing unit;

a cockpit mounted display unit coupled to said data processing unit, and including switch means for selecting any of at least ten desired aircraft operational data or turbine operating parameters and for displaying the selected data;

whereby detailed aircraft turbine engine data is available for display, as well as altitude and other aircraft operating data which may be selectively obtained for standby or check purposes in the event of cockpit instrumentation failure.

* * * * *